United States Patent
Kim et al.

(10) Patent No.: US 7,688,410 B2
(45) Date of Patent: Mar. 30, 2010

(54) SUBSTRATE FOR A DISPLAY APPARATUS

(75) Inventors: Jae-Hyun Kim, Seoul (KR); Won-Sang Park, Yongin-si (KR); Sang-Woo Kim, Suwon-si (KR); Sung-Eun Cha, Geojae-si (KR); Jae-Young Lee, Seoul (KR); Jae-Ik Lim, Chuncheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/871,780

(22) Filed: Oct. 12, 2007

(65) Prior Publication Data
US 2008/0036949 A1  Feb. 14, 2008

Related U.S. Application Data

(63) Continuation of application No. 11/031,555, filed on Jan. 6, 2005, now abandoned.

(30) Foreign Application Priority Data

Jan. 6, 2004 (KR) .................................. 2004-701
Feb. 27, 2004 (KR) .............................. 2004-13337

(51) Int. Cl.
*G02F 1/1335* (2006.01)
*G02F 1/1337* (2006.01)
(52) U.S. Cl. ...................................... 349/114; 349/129
(58) Field of Classification Search .................. 349/106, 349/114, 129
See application file for complete search history.

(56) References Cited

U.S. PATENT DOCUMENTS

| 6,654,090 | B1 | 11/2003 | Kim et al. | |
| 6,809,787 | B1 * | 10/2004 | Seo et al. | 349/129 |
| 2003/0067570 | A1 | 4/2003 | Okamoto et al. | |
| 2003/0117551 | A1 * | 6/2003 | Fujimori et al. | 349/113 |
| 2003/0202144 | A1 * | 10/2003 | Kim et al. | 349/129 |
| 2004/0061817 | A1 | 4/2004 | Maeda | |
| 2004/0160556 | A1 * | 8/2004 | Tsuchiya et al. | 349/114 |

FOREIGN PATENT DOCUMENTS

CN  1435714 A  1/2003

OTHER PUBLICATIONS

English abstract of above.

* cited by examiner

*Primary Examiner*—David Nelms
*Assistant Examiner*—Nathanael R Briggs
(74) *Attorney, Agent, or Firm*—Innovation Counsel LLP

(57) ABSTRACT

A display panel according to one aspect of the present invention includes a lower substrate, an upper substrate and a liquid crystal layer. The lower substrate includes a plate, a switching element, an insulating layer, a transmission electrode and a protrusion. The plate has a transmission region through which a light may pass. The switching element is formed on the plate. The insulating layer is formed on the plate to cover the switching element. The transmission electrode is electrically connected to the switching element. The transmission electrode is formed in the transmission region. The protrusion divides the transmission region into a plurality of transmission portions. The upper substrate faces the lower substrate. The liquid crystal layer is disposed between the lower substrate and the upper substrate. Advantageously, an image display quality of the display apparatus is improved, and manufacturing cost is decreased.

17 Claims, 45 Drawing Sheets

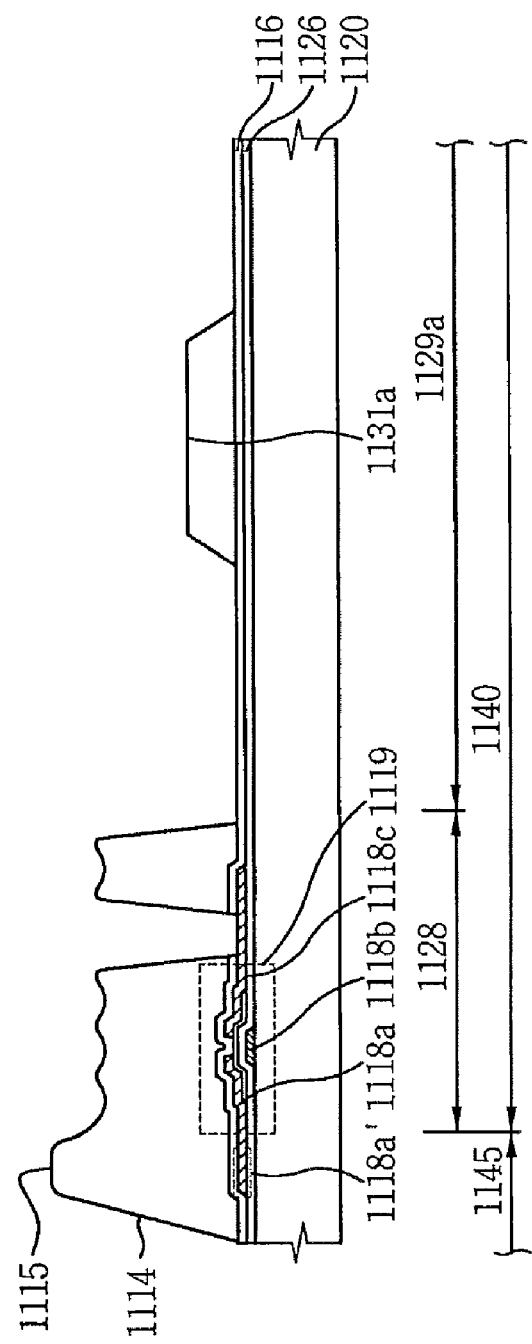

SUBSTRATE FOR A DISPLAY APPARATUS

CROSS-REFERENCE OF RELATED APPLICATIONS

This application is a continuation of and claims priority to U.S. application Ser. No. 11/031,555 filed Jan. 6, 2005 now abandoned, which claims priority to Korean Patent Application No. 2004-00701, filed on Jan. 6, 2004 and Korean Patent Application No. 2004-13337, filed on Feb. 27, 2004, the disclosures of which are hereby incorporated herein by reference in their entireties.

BACKGROUND

1. Field of the Invention

The present invention relates to a substrate for a display apparatus, and more particularly, the present invention relates to a substrate for a display apparatus having improved image display quality, including but not limited to an improved viewing angle.

2. Description of the Related Art

In an LCD apparatus that is one of flat panel display (FPD) apparatuses, generally, liquid crystal arrangement varies in response to an electric field applied to the liquid crystal, and thus a light transmittance of the liquid crystal may be changed to display an image.

The LCD apparatus displays the image using the liquid crystal having anisotropy so that the anisotropy of the liquid crystal varies based on a direction of a light that passes through the liquid crystal. The image display quality is dependent on an angle of a viewpoint. In a conventional LCD apparatus, the range of the viewpoint angle is restricted by image display quality deterioration. The viewpoint angle having a contrast ratio of more than about 10:1 is defined as a viewing angle limit/threshold of the LCD apparatus. The contrast ratio is a ratio of a luminance of a dark image to a luminance of a bright image. When the LCD apparatus displays a darker image, and has more uniform luminance, the contrast ratio of the LCD apparatus increases.

The LCD apparatus may include a normally black mode and a black matrix having a decreased reflectivity so as to prevent the leakage of a light and to display the darker image. When voltage is not applied to a common electrode and a pixel electrode of the LCD apparatus having the normally black mode, a black image is displayed. In order to make the luminance uniform, the LCD apparatus includes a compensation film or a liquid crystal layer having a multi-domain. A plurality of domains in the liquid crystal layer forms the multi-domain.

In order to improve the image display quality, liquid crystal molecules may have optimized optical characteristics. In addition, the LCD apparatus may have the multi-domain, a retardation film, etc.

The LCD apparatus of the multi-domain includes a vertical alignment (VA) mode, an in-plane switching (IPS) mode, etc. When an electric field is applied to a liquid crystal layer of the LCD apparatus of the multi-domain, liquid crystal molecules of the liquid crystal layer are aligned in a plurality of directions so that the viewing angle of the LCD apparatus is increased.

A transmissive-reflective LCD apparatus includes a reflection region and a transmission region, and the transmissive-reflective LCD apparatus displays an image having good image display quality in a dark place or a bright place. In general, the liquid crystal layer of the reflection region has a different thickness from the liquid crystal layer of the transmission region. The thickness of the liquid crystal layer is determined by a light path. A mobile display apparatus has the VA mode or the liquid crystal layer having the multi-domain to increase the viewing angle.

The transmissive-reflective LCD apparatus includes the retardation film between a polarizer and the liquid crystal layer so that a light that has passed through the polarizer is circularly polarized.

The light transmittance of the liquid crystal layer of the transmissive-reflective LCD apparatus is determined by an angle of the liquid crystal with respect to a vertical direction of the liquid crystal layer so that the transmissive-reflective LCD apparatus may be manufactured without a rubbing process. However, when the transmissive-reflective LCD apparatus is manufactured without the rubbing process, a portion of the liquid crystal layer corresponding to a central portion of the transmission region may be misaligned so that the image display quality of the LCD apparatus is lowered. In particular, a stepped portion is formed at an interface between the reflection region and the transmission region so that a portion of the liquid crystal layer adjacent to the stepped portion is aligned along the interface. In contrast, the portion of the liquid crystal layer corresponding to the central portion of the transmission region may not be aligned along the interface.

When the transmissive-reflective LCD apparatus is manufactured through the rubbing process, manufacturing cost of transmissive-reflective LCD apparatus is increased. In addition, the LCD apparatus may be non-uniformly rubbed so that the image display quality of the LCD apparatus is deteriorated.

BRIEF SUMMARY

The present invention provides a substrate for a display apparatus having improved image display quality.

The present invention also provides a display apparatus having the substrate.

The present invention also provides a method of manufacturing the substrate for the display apparatus.

The present invention also provides a method of manufacturing the display apparatus.

The present invention also provides a color filter substrate capable of improving a viewing angle and an image display quality.

The present invention also provides a liquid crystal display (LCD) apparatus having the substrate.

The present invention also provides a method of manufacturing the color filter substrate.

The present invention also provides a method of manufacturing the LCD apparatus.

A substrate for a display apparatus in accordance with an aspect of the present invention includes a plate, a switching element, an insulating layer, and a partition wall. The plate has a reflection region from which a light that is provided from an exterior to the substrate is reflected and a transmission region through which a light generated from a backlight assembly passes. The switching element is on the plate. The insulating layer is on the plate having the switching element. The transmission region of the insulating layer is recessed when compared to the reflection region of the insulating layer. The insulating layer includes a contact hole through which a first electrode of the switching element is partially exposed. The partition wall divides the transmission region into a plurality of transmission portions.

A substrate for a display apparatus in accordance with another aspect of the present invention includes a plate, a switching element, a first pixel electrode portion, an insulating layer, a second pixel electrode portion, and a partition wall. The switching element is on the plate. The first pixel electrode portion is on the plate having the switching element. The insulating layer is on the plate having the switching element and the first pixel electrode portion. The insulating layer includes a contact hole through which a first electrode of the switching element is partially exposed and an opening through which the first pixel electrode portion is partially exposed. The second pixel electrode portion is on the insulating layer. The second pixel electrode portion is electrically connected to the first electrode of the switching element and the first pixel electrode portion. The partition wall is on the first pixel electrode portion to divide the exposed first pixel electrode portion that is exposed through the opening of the insulating layer into a plurality of transmission portions.

A substrate for a display apparatus in accordance with still another aspect of the present invention includes a plate, a switching element, an insulating layer, a partition wall and a pixel electrode. The plate has a reflection region from which a light that is provided from an exterior to the substrate is reflected and a transmission region adjacent to the reflection region. The switching element is on the plate. The insulating layer is on the plate having the switching element. The transmission region of the insulating layer is recessed when compared to the reflection region of the insulating layer. The insulating layer includes a contact hole through which a first electrode of the switching element is partially exposed. The partition wall is on the plate having the switching element to divide the transmission region into a plurality of transmission portions. The pixel electrode is on the insulating layer so that the pixel electrode is electrically connected to the first electrode of the switching element.

A display apparatus having the substrate in accordance with an aspect of the present invention includes a lower substrate and an upper substrate. The lower substrate includes a first plate, a switching element, an insulating layer, and a partition wall. The first plate has a reflection region from which a light that is provided from an exterior to the lower substrate is reflected and a transmission region adjacent to the reflection region. The switching element is on the first plate. The insulating layer is on the plate having the switching element. The transmission region of the insulating layer is recessed when compared to the reflection region of the insulating layer. The insulating layer includes a contact hole through which a first electrode of the switching element is partially exposed. The partition wall divides the transmission region into a plurality of transmission portions. The upper substrate includes a second plate and a common electrode on the second plate. The upper substrate corresponds to the lower substrate. The common electrode has at least one pattern of the transmission portions.

A display apparatus having the substrate in accordance with another aspect of the present invention includes a lower substrate and an upper substrate. The lower substrate includes a first plate, a switching element, a first pixel electrode portion, an insulating layer, a second pixel electrode portion and a partition wall. The switching element is on the first plate. The first pixel electrode portion is on the first plate having the switching element. The insulating layer is on the first plate having the switching element and the first pixel electrode portion. The insulating layer includes a contact hole through which a first electrode of the switching element is partially exposed and an opening through which the first pixel electrode portion is partially exposed. The second pixel electrode portion is on the insulating layer. The second pixel electrode portion is electrically connected to the first electrode of the switching element and the first pixel electrode portion. The partition wall is on the first pixel electrode portion to divide the exposed first pixel electrode portion that is exposed through the opening of the insulating layer into a plurality of transmission portions. The upper substrate includes a second plate and a common electrode on the second plate. The upper substrate corresponds to the lower substrate. The common electrode has a pattern corresponding to one of the transmission portions.

A display apparatus having the substrate in accordance with still another aspect of the present invention includes a lower substrate and an upper substrate. The lower substrate includes a first plate, a switching element, an insulating layer, a partition wall and a pixel electrode. The first plate has a reflection region from which a light that is provided from an exterior to the lower substrate is reflected and a transmission region adjacent to the reflection region. The switching element is on the first plate. The insulating layer is on the first plate having the switching element. The transmission region of the insulating layer is recessed when compared to the reflection region of the insulating layer. The insulating layer includes a contact hole through which a first electrode of the switching element is partially exposed. The partition wall is on the first plate having the switching element to divide the transmission region into a plurality of transmission portions. The pixel electrode is on the insulating layer so that the pixel electrode is electrically connected to the first electrode of the switching element. The upper substrate includes a second plate and a common electrode on the second plate. The upper substrate corresponds to the lower substrate. The common electrode has a pattern corresponding to one of the transmission portions.

A method of manufacturing a substrate for a display apparatus in accordance with an aspect of the present invention is provided as follows. A switching element is formed on a plate. A first pixel electrode part is formed on the plate having the switching element. An insulating layer is formed on the plate having the switching element and the first pixel electrode part. The insulating layer has a contact hole through which a first electrode of the switching element is partially exposed and an opening through which the first pixel electrode part is partially exposed. A partition wall is formed to divide the exposed portion of the first pixel electrode part that is exposed through the opening into a plurality of transmission portions. A second pixel electrode part is formed on the insulating layer. The second pixel electrode part is electrically connected to the first electrode and the first pixel electrode part.

A method of manufacturing a substrate for a display apparatus in accordance with another aspect of the present invention is provided as follows. A switching element is formed on a plate having a reflection region from which a light that is provided from an exterior to the substrate is reflected, and a transmission region adjacent to the reflection region. An insulating layer is formed on the plate having the switching element. The transmission region of the insulating layer is recessed when compared to the reflection region of the insulating layer. The insulating layer has a contact hole through which a first electrode of the switching element is partially exposed. A partition wall is formed in the transmission region to divide the transmission region into a plurality of transmission portions. A second pixel electrode part is formed on the insulating layer. The second pixel electrode part is electrically connected to the first electrode and the first pixel electrode part.

A method of manufacturing a display apparatus in accordance with an aspect of the present invention is provided as follows. A switching element is formed on a first plate having a reflection region from which a light that is provided from an exterior to the first plate is reflected and a transmission region adjacent to the reflection region. An insulating layer is formed on the first plate having the switching element. The transmission region of the insulating layer is recessed when compared to the reflection region of the insulating layer. The insulating layer has a contact hole through which a first electrode of the switching element is partially exposed. A partition wall is formed in the transmission region to divide the transmission region into a plurality of transmission portions. A common electrode is formed on a second plate. The common electrode has a pattern corresponding to one of the transmission portions.

A color filter substrate in accordance with an aspect of the present invention includes a transparent plate, a color filter and a common electrode. The transparent plate includes a display region and a peripheral region that surrounds the display region. The color filter is on the transparent plate corresponding to the display region. The color filter has a recess for a multi-domain in the display region. The common electrode is on the peripheral region of the transparent plate, the color filter and an inner surface of the recess for the multi-domain to form a distorted electric field adjacent to the recess for the multi-domain.

An LCD apparatus in accordance with an aspect of the present invention includes a second plate, a color filter, a common electrode, a first plate, a pixel electrode and a liquid crystal layer. The second plate includes a display region and a peripheral region that surrounds the display region. The color filter is on the second plate corresponding to the display region. The color filter has a recess for a multi-domain in the display region. The common electrode is on the peripheral region of the second plate, the color filter and an inner surface of the recess for the multi-domain to form a distorted electric field adjacent to the recess for the multi-domain. The first plate includes a pixel region corresponding to the display region and a switching element in the pixel region. The pixel electrode is in the pixel region of the first plate. The pixel electrode is electrically connected to an electrode of the switching element. The liquid crystal layer is between the pixel electrode and the common electrode.

A method of manufacturing a color filter substrate in accordance with an aspect of the present invention is provided as follows. An organic material having a predetermined color is coated on a transparent plate having a display region and a peripheral region that surrounds the display region. A portion of the coated organic material is removed to form a color filter in the display region. The color filter has a recess for a multi-domain. A transparent insulating material is on the transparent plate having the color filter to form a common electrode that forms a distorted electric field adjacent to the recess for the multi-domain.

A method of manufacturing the LCD apparatus in accordance with an aspect of the present invention is provided as follows. An organic material having a predetermined color is coated on a second plate having a display region and a peripheral region that surrounds the display region. A portion of the coated organic material is removed to form a color filter in the display region, the color filter having a recess for a multi-domain. A transparent insulating material is deposited on the second plate having the color filter to form a common electrode that forms a distorted electric field adjacent to the recess for the multi-domain. A switching element and a pixel electrode that is electrically connected to an electrode of the switching element are formed in a pixel region of a first plate that corresponds to the second plate. The pixel region corresponds to the display region. A liquid crystal layer is formed between the pixel electrode and the common electrode.

The transmission region includes a transmission window.

Therefore, the display apparatus includes a liquid crystal layer having a vertical alignment (VA) mode and the multi-domain so that the image display quality of the display apparatus is improved. The liquid crystal layer having the VA mode may be inclined by a predetermined pretilt angle. In addition, the display apparatus may be manufactured without a rubbing process. In particular, the liquid crystal layer includes the multi-domain so that the viewing angle of the LCD apparatus is improved. Furthermore, a manufacturing process of the display apparatus is simplified so that a manufacturing cost of the display apparatus is decreased.

BRIEF DESCRIPTION OF THE DRAWINGS

The above and other advantages of the present invention will become more apparent by describing in detail embodiments thereof with reference to the accompanying drawings, in which:

FIGS. 9A to 9K are cross-sectional views showing a method of manufacturing the LCD apparatus shown in FIG. 6;

DETAILED DESCRIPTION

It should be understood that the embodiments of the present invention described below may be modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter, the present invention will be described in detail with reference to the accompanying drawings.

Figure 1A:
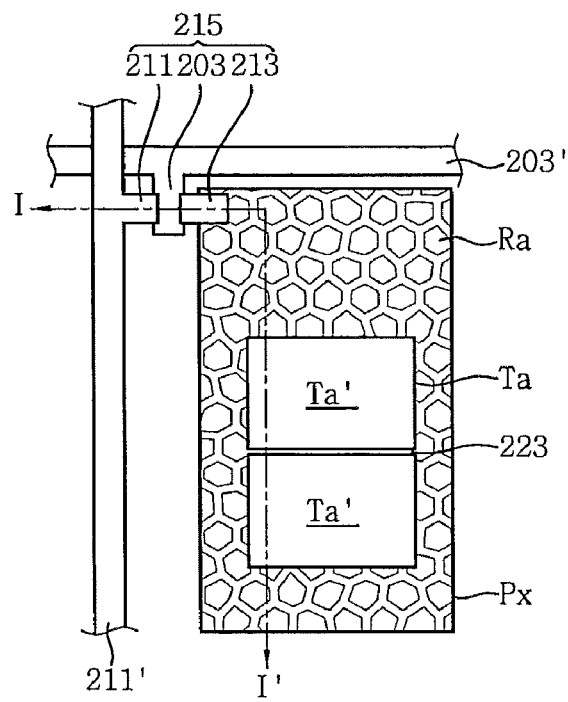
FIG. 1A is a plan view showing a lower substrate of a display apparatus in accordance with an embodiment of the present invention.
Figure 1B:
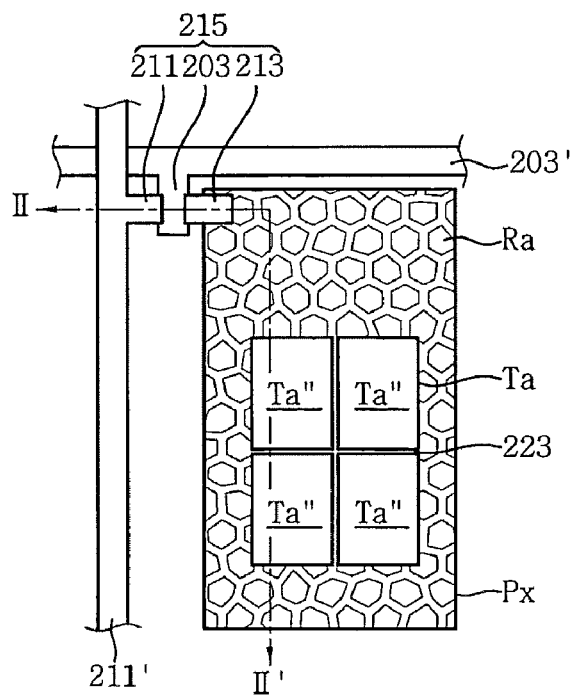
FIG. 1B is a plan view showing a lower substrate of a display apparatus in accordance with another embodiment of the present invention.

FIG. 1A is a plan view showing a lower substrate of a display apparatus in accordance with an embodiment of the present invention. FIG. 1B is a plan view showing a lower substrate of a display apparatus in accordance with another embodiment of the present invention.

Referring to FIGS. 1A and 1B, the lower substrate includes a switching element 215, a gate line 203' that is electrically connected to the switching element 215, a data line 211' that is electrically connected to the switching element 215, a pixel area Px, and a pixel electrode in the pixel area Px. The switching element 215 includes a gate electrode 203, a first electrode 211, and a second electrode 213. The pixel area Px includes a reflection region Ra and a transmission region Ta. Referring to FIG. 1A, the transmission region Ta is divided into two transmission portions Ta' by a partition wall 223. Alternatively, the transmission region Ta may be divided into four transmission portions Ta" by a plurality of partition walls 223 as shown in FIG. 1B. In these embodiments, the transmission portions have substantially equal areas to one another. Alternatively, the transmission portions may have different areas from one another. An embossed portion is formed on the reflection region Ra in one example. The pixel electrode includes a first pixel electrode part 219 and a second pixel electrode part 225 (FIG. 2A).

A driving integrated circuit (IC) outputs a selection signal to the gate electrode 203 through the gate line 203', and the driving IC outputs a data voltage to the pixel electrode through the data line 211' and the switching element 215.

The lower substrate is combined with an upper substrate (not shown) so that a liquid crystal layer (not shown) is interposed between the lower substrate and the upper substrate (not shown) to form a display apparatus. The upper substrate (not shown) includes a color filter (not shown), a common electrode (not shown), etc. Alternatively, the common electrode (now shown) may include a pattern. The liquid crystal layer (not shown) may include a vertical alignment (VA) mode, a reverse twisted nematic (RTN) mode, etc.

Figure 2A:
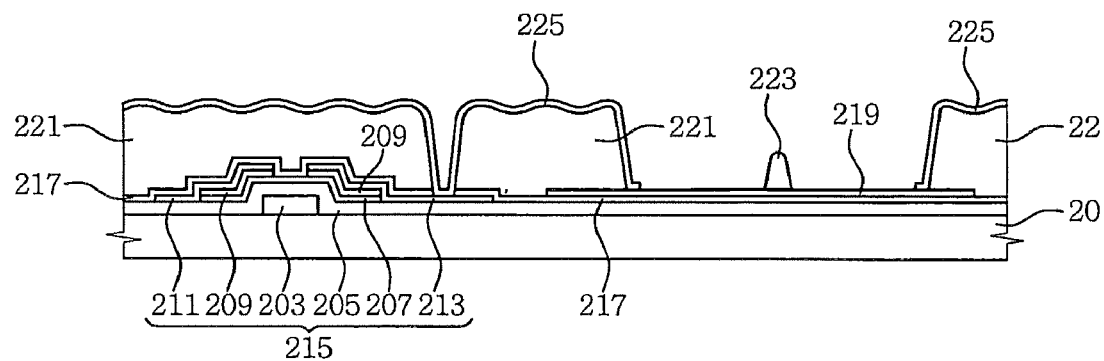
FIG. 2A is a cross-sectional view taken along the line I-I' shown in FIG. 1A.
Figure 2B:
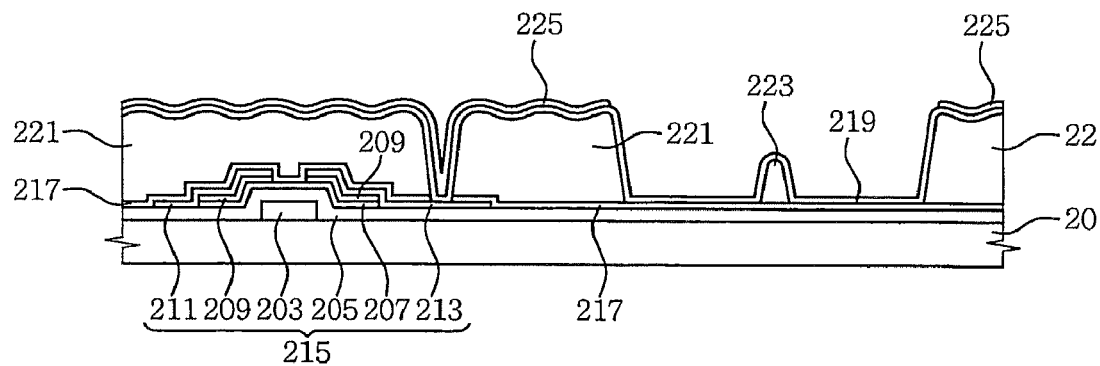
FIG. 2B is a cross-sectional view taken along the line II-II' shown in FIG. 1B.

FIG. 2A is a cross-sectional view taken along the line I-I' shown in FIG. 1A. FIG. 2B is a cross-sectional view taken along the line II-II' shown in FIG. 1B.

Referring to FIG. 2A, the first pixel electrode part 219 is under the partition wall 223. The switching element 215 and the first pixel electrode part 219 are on a first plate 201. The partition wall 223, an insulating layer 221 in which the transmission region Ta is opened, and the second pixel electrode part 225 are on the first plate 201 having the switching element 215 and the first pixel electrode part 219. The first pixel electrode part 219 is in the transmission region Ta, and the second pixel electrode part 225 is in the reflection region Ra.

That is, the lower substrate includes the first plate 201, the switching element 215, the first pixel electrode part 219, the insulating layer 221, and a second pixel electrode part 225. The switching element 215 is on the first plate 201. The first pixel electrode part 219 is over a remaining portion of the first plate 201 on which the switching element 215 is not formed. The insulating layer 221 is over the first plate 201 having the switching element 215 and the first pixel electrode part 219. The first electrode 213 of the switching element 215 and the first pixel electrode part 219 are partially exposed through openings of the insulating layer 221. The partition wall 223 is formed from a same layer as the insulating layer 221. The second pixel electrode part 225 is on the insulating layer 221 so that the second pixel electrode part 225 is electrically connected to the first electrode 213 of the switching element 215 and the first pixel electrode part 219.

The transmission region Ta may have a variety of shapes, including but not limited to a circular shape, a polygonal shape, and an elliptical shape. The polygonal shape may include a quadrangular shape, a hexagonal shape, and an octagonal shape, in one example.

The first and second pixel electrodes 219 and 225 may have a mono-layered structure, a double-layered structure, etc. In this embodiment, a passivation layer 217 is between the switching element 215 and the insulating layer 221. The first pixel electrode part 219 is a transparent electrode having indium tin oxide (ITO) or indium zinc oxide (IZO) in one example, and the second pixel electrode part 225 is an opaque electrode having aluminum, or aluminum alloy in another example. The second pixel electrode part 225 may have a multi-layered structure including an aluminum layer. An alloy layer having molybdenum, tungsten, etc., may be formed between the first and second pixel electrode parts 219 and 225.

The partition wall 223 has a material that is substantially similar to the insulating layer 221.

Referring to FIG. 2B, the first pixel electrode part 219 is arranged on the partition walls 223. The lower substrate of FIG. 2B is substantially the same as in FIG. 2A except for the first and second pixel electrode parts 219 and 225. The first pixel electrode part 219 is arranged on the insulating layer 221, and the second pixel electrode part 225 is arranged on the first pixel electrode part 219. In addition, the first pixel electrode part 219 is formed on the partition walls 223.

According to this embodiment, a stepped portion is formed at an interface between the reflection region Ra and the transmission region Ta, and the partition wall 223 is formed in the transmission region Ta so that the liquid crystal layer (not shown) may be aligned along the interface and the partition wall 223 when voltage is not applied to the pixel electrode. Therefore, although a rubbing process is omitted, the liquid crystal layer (not shown) corresponding to a central portion of the transmission region Ta is aligned so that the image display quality of the display apparatus is improved. In addition, as the lower substrate is manufactured without the rubbing process, the manufacturing cost of the lower substrate is decreased while yield of the lower substrate is increased.

Figure 3A:
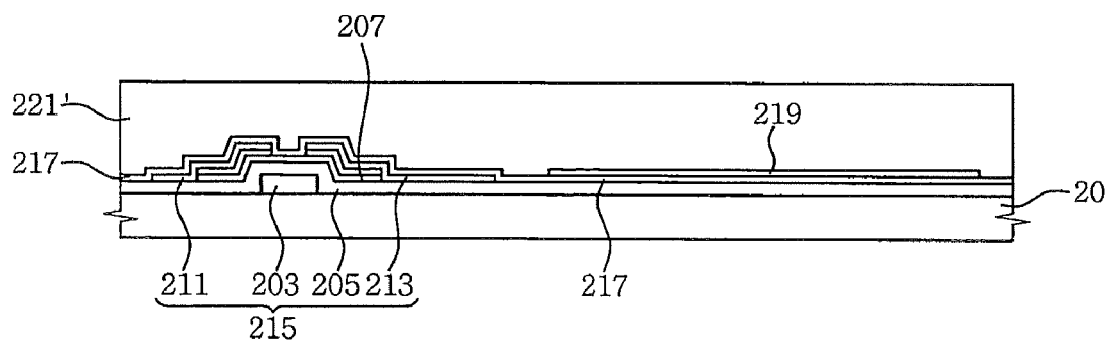
FIGS. 3A to 3C are cross-sectional views showing a method of manufacturing the lower substrate shown in FIG. 2A.
Figure 3B:
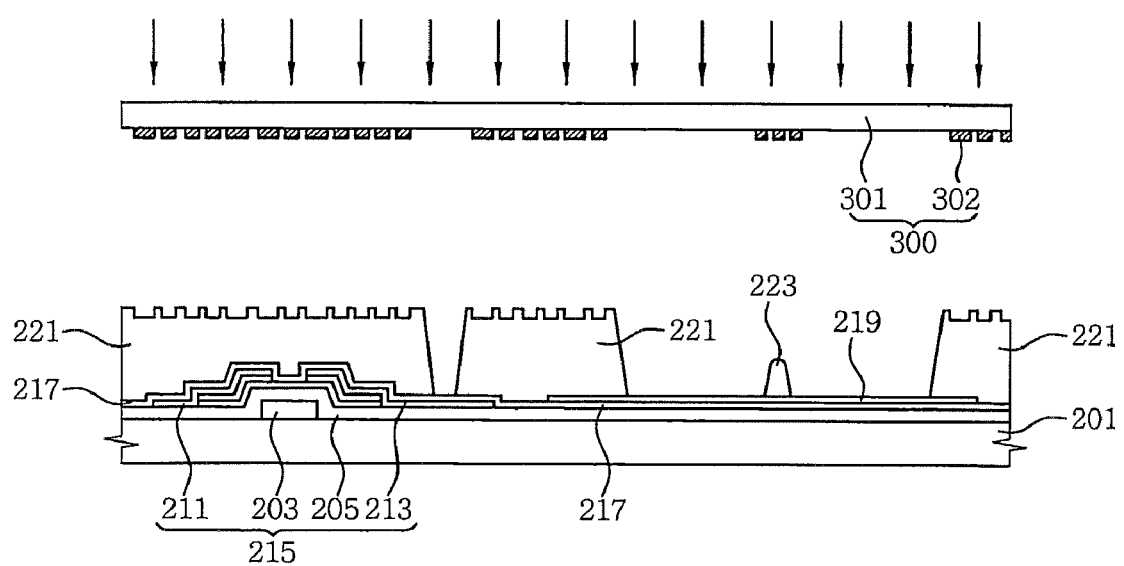
Figure 3C:
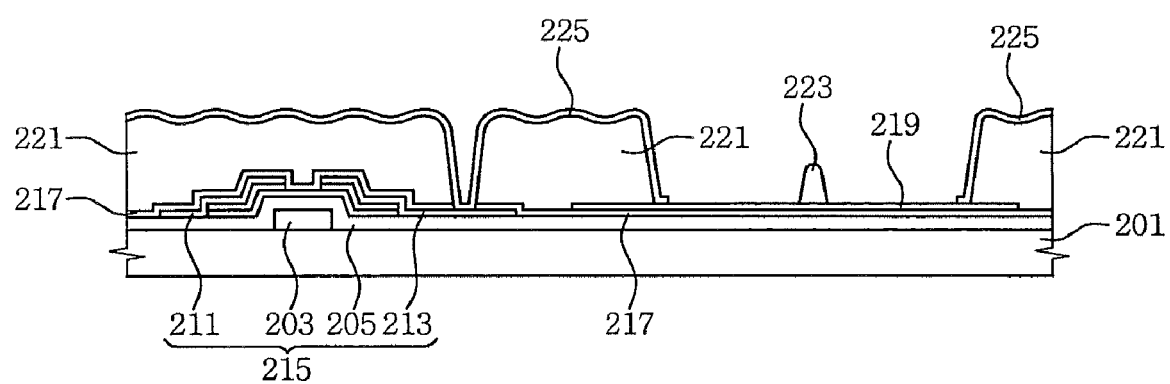

FIGS. 3A to 3C are cross-sectional views showing a method of manufacturing the lower substrate shown in FIG. 2A.

Referring to FIG. 3A, the switching element 215 is formed on the first plate 201. The first pixel electrode part 219 is formed on the remaining portion of the first plate 201 on which the switching element 215 is not formed. The insulating layer 221' is formed on the first plate 201 having the switching element 215 and the first pixel electrode part 219.

The first plate 201 is comprised of a transparent material such as glass, quartz, etc. The first plate 201 is an insulator. The switching element 215 includes a thin film transistor (TFT). The switching element 215 has a gate electrode 203, a gate insulating layer 205, a channel layer 207, the first electrode 211' that is a drain electrode, and the second electrode 213 that is a source electrode. Alternatively, the first electrode may be the source electrode, and the second electrode may be the drain electrode. Each of the gate electrode 203, the first electrode 211, and the second electrode 213 has a metallic thin film, and may include a multi-layered thin film having metals such as aluminum. Each of the gate electrode 203, the first electrode 211, and the second electrode 213 may be formed through a sputtering process in one example. The gate insulating layer 205 includes an insulating material such as silicon nitride, silicon oxide, etc. The channel layer 207 is a semiconductor layer such as a silicon layer. Each of the gate insulating layer 205 and the channel layer 207 may be formed through a chemical vapor deposition (CVD) method in one example.

The gate electrode 203 and the gate line 203' shown in FIG. 1A are formed on the first plate 201. The gate insulating layer 205 is formed on the first plate 201 having the gate electrode 203 and the gate line 203'. The semiconductor layer and an ohmic contact layer are formed on the gate insulating layer 205. The semiconductor layer and the ohmic contact layer are partially patterned to form a semiconductor pattern and an ohmic contact pattern. A metal layer (not shown) is formed on the first plate 201 having the ohmic contact pattern. The metal layer (not shown) is partially patterned to form the first electrode 211, the second electrode 213, and the data line 211' (FIG. 1A). The first and second electrodes 211 and 213 correspond to the gate electrode 203, and the first electrode 211 is spaced apart from the second electrode 213.

The ohmic contact pattern between the first and second electrodes 211 and 213 is etched by using the first and second electrodes 211 and 213 as an etching mask to form the channel layer 207, thereby forming the switching element 215. Alternatively, the semiconductor layer (not shown), the ohmic contact layer (not shown), and the metal layer (not shown) are deposited and patterned to form the first and second electrodes, and the ohmic contact pattern between the first and second electrodes is etched to form the switching element 215. The passivation layer 217 is formed on the switching element 215. The passivation layer 217 may include an insulating material such as silicon nitride in one example.

A transparent insulating material is coated on the passivation layer 217. In this embodiment, the transparent insulating material includes organic material so that the insulating layer 221' has a lower dielectric constant than the gate insulating layer 205 or the passivation layer 217. In addition, the insulating layer 221 is thicker than the gate insulating layer 205 or the passivation layer 217. Furthermore, the insulating layer 221' has a flat surface.

Referring to FIG. 3B, a reticle 300 of an exposure unit is prepared so that the coated organic material of insulating layer 221' shown in FIG. 3A is partially exposed through the reticle 300. That is, a portion of the coated organic material of insulating layer 221' corresponding to a portion of the second electrode 213 and a portion of the transmission region Ta are opened, and a remaining portion of the transmission region Ta corresponding to the partition wall 223 is blocked by the reticle 300. Thus, the insulating layer 221 is formed.

In this embodiment, the organic material includes photosensitive material so that the insulating layer 221 is formed through a photoprocess including an exposure process and a development process. Alternatively, the insulating layer 221 may be formed through a photolithography process.

When a light is irradiated onto the coated organic material, an exposed portion of the coated organic material is altered so that the exposed portion of the coated organic material is removed through the development process. The reticle 300 includes a transparent substrate 301 and opaque patterns 302 formed on the transparent substrate 301. The opaque patterns 302 are comprised of an opaque material such as chrome (Cr), chrome oxide, etc.

In this embodiment, the portion of the coated organic material corresponding to the portion of the second electrode 213 and the portion of the transmission region Ta are opened, and the remaining portion of the transmission region Ta corresponding to the partition wall 223 is blocked by the reticle 300. Alternatively, the portion of the coated organic material corresponding to the portion of the second electrode 213 and the portion of the transmission region Ta may be blocked, and the remaining portion of the transmission region Ta corresponding to the partition wall 223 may be exposed through the reticle 300.

The reticle 300 has a pattern for the partition wall 223 so that the partition wall 223 is formed from the same layer as the insulating layer 221. The transmission region Ta of the insulating layer 221 is recessed when compared to the reflection region Ra of the insulating layer 221. The pattern for the partition wall 223 may be an opaque portion, a slit, or a translucent portion so that a height of the partition wall 223 is no more than a thickness of the insulating layer 221 of the reflection region Ra. In this embodiment, the pattern for the partition wall 223 has the slit so that the height of the partition wall 223 is less than the thickness of the insulating layer 221 of the reflection region Ra, and the partition wall 223 has an inclined surface with respect to a bottom surface of the first plate 201.

An embossed pattern for the embossed portion is formed on the insulating layer 221 through the photo process and a heating process that is performed after the development process.

Referring to FIG. 3C, the second pixel electrode part 225 is formed on the insulating layer 221 corresponding to the reflection region Ra so that the second pixel electrode part 225 is electrically connected to the first pixel electrode part 219 and the second electrode 213.

The insulating layer 221 corresponding to the transmission region Ta is removed so that the liquid crystal layer (not shown) of the transmission region Ta has different thickness from the liquid crystal layer (not shown) of the reflection region Ra. The insulating layer corresponding to the transmission region may be partially or completely removed. In this embodiment, a thickness of the liquid crystal layer (not shown) of the reflection region Ra is twice of a thickness of the liquid crystal layer (not shown) of the transmission region Ta so that a light that has passed through the liquid crystal layer (not shown) of the reflection region Ra has substantially equal path length to a light that has passed through the liquid crystal layer (not shown) of the transmission region Ta. Therefore, the reflection region Ra has substantially equal optical characteristics to the transmission region Ta. Alternatively, the thickness of the liquid crystal layer (not shown) of the reflection region Ra may be adjusted so that the optical characteristics of the reflection region Ra may be optimized, and the thickness of the liquid crystal layer (not shown) of the transmission region Ta may be determined by the thickness of the liquid crystal layer (not shown) of the reflection region Ra and the thickness of the insulating layer 221.

A method of manufacturing the lower substrate of FIG. 2B is same as in FIG. 2A except that the first pixel electrode part 219 is formed after the insulating layer 221 is formed. That is, the first pixel electrode part 219 of FIG. 2B is formed on the insulating layer 221. An opaque material such as aluminum, aluminum alloy, etc., is deposited on the first pixel electrode part 219, and the deposited opaque material is then partially removed to form the second pixel electrode part 225. An alloy layer that has molybdenum-tungsten may be between the first and second pixel electrode parts 219 and 225.

Figure 4A:
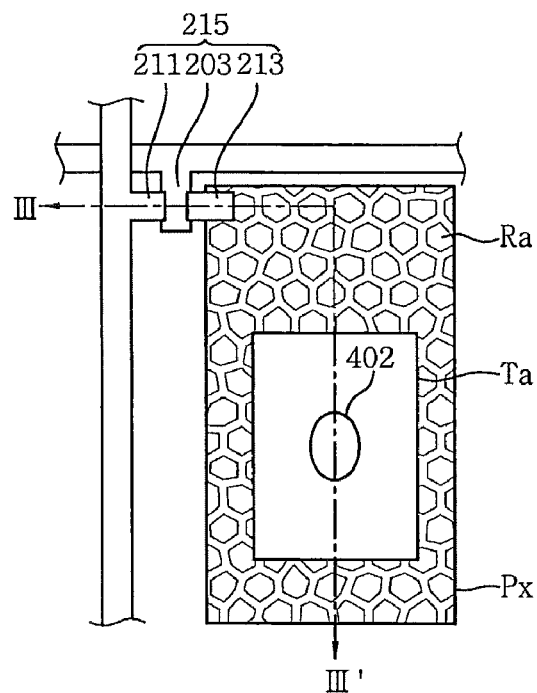
FIG. 4A is a plan view showing a display apparatus in accordance with another embodiment of the present invention.
Figure 4B:
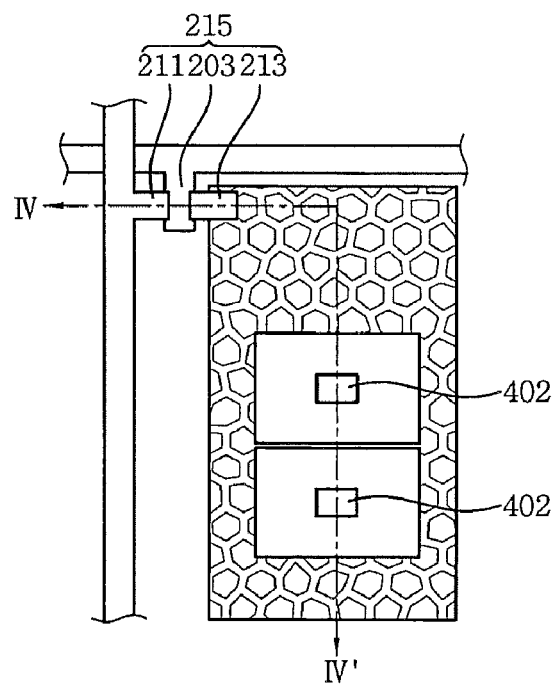
FIG. 4B is a plan view showing a display apparatus in accordance with another embodiment of the present invention.
Figure 4C:
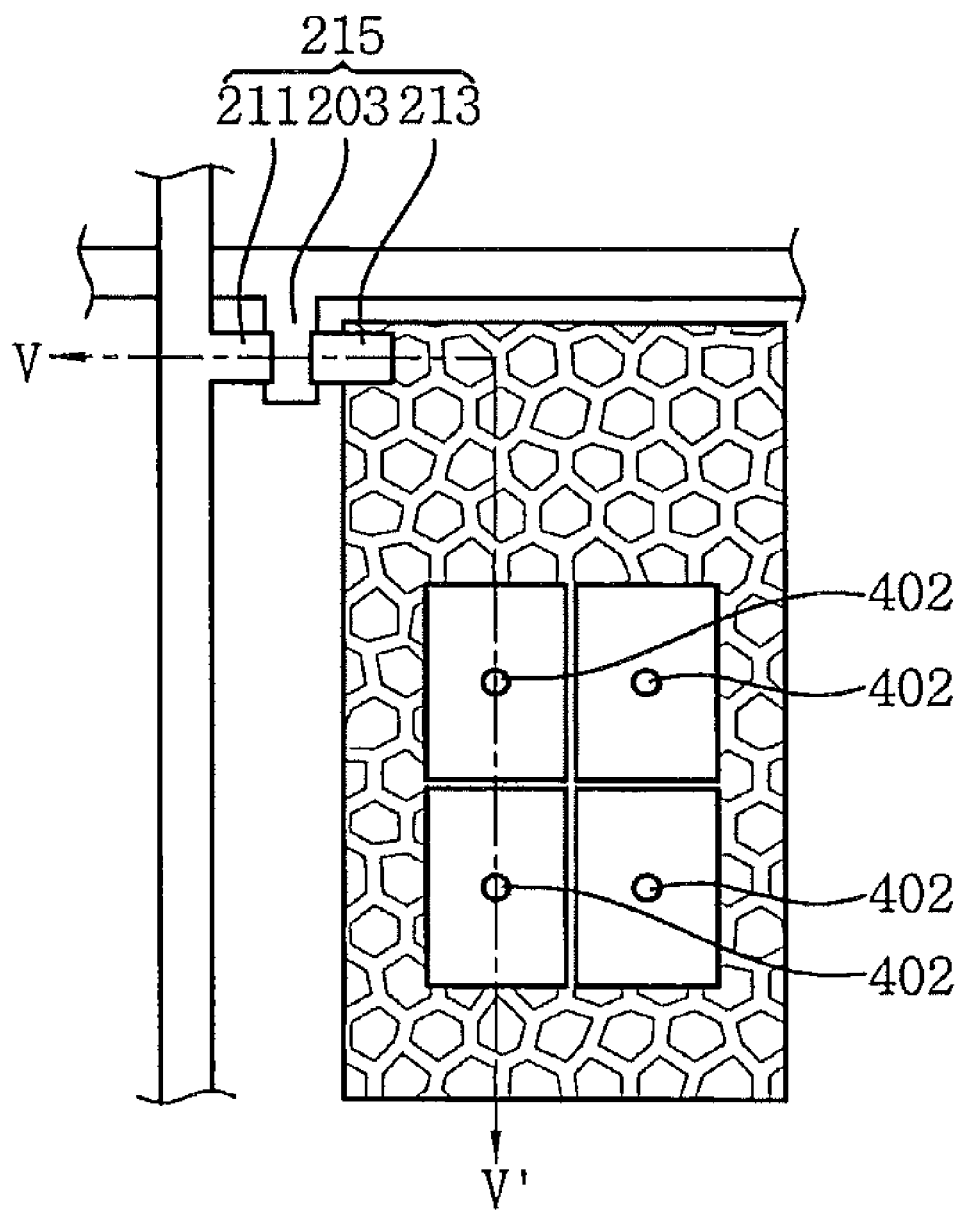
FIG. 4C is a plan view showing a display apparatus in accordance with another embodiment of the present invention.

FIGS. 4A, 4B, and 4C are plan views showing display apparatuses in accordance with other embodiments of the present invention.

A common electrode of an upper substrate of the display apparatus includes a pattern 402 having various shapes such as a circular shape, an elliptical shape, a polygonal shape, etc. Alternatively, the common electrode may have a plurality of the patterns 402. When a transmission region Ta is divided into a plurality of transmission portions, the common electrode has the patterns 402 that correspond to the transmission patterns 402. The common electrode may also have various patterns 402. In this embodiment, each of the patterns 402 is on a central portion of each of the transmission portions. The common electrode is partially removed to form the patterns 402.

A cross-sectional view of a lower substrate of each of the display apparatuses of FIGS. 4A to 4C may be substantially the same as in FIG. 1A. Alternatively, the cross-sectional view of a lower substrate of each of the display apparatuses of FIGS. 4A to 4C may be substantially the same as in FIG. 1B. A liquid crystal layer (not shown) is between the upper substrate and the lower substrate. The liquid crystal layer (not shown) may include a vertical alignment (VA) mode, a reverse twisted nematic (RTN) mode, etc.

The display apparatus may include a light source, a light guide plate, optical sheets, a polarizer, and a retardation film. The light guide plate guides a light generated from the light source into the lower substrate. The light source, the light guide plate, the optical sheets, the polarizer, and the retardation film are under the lower substrate. The retardation film delays a phase of a light that passes through the retardation film by about $\lambda/4$. An upper retardation film and an upper polarizer may be on the upper substrate. In this embodiment, the display apparatus has a normally black mode using the retardation films, the liquid crystal layer, and the polarizers. When voltage is not applied to the common electrode, a first electrode part, and/or a second electrode part, the light may not pass through the display apparatus so that the display apparatus displays black. Alternatively, the display apparatus has a normally white mode. When the voltage is not applied to the common electrode, a first electrode part, and/or a second electrode part, the light may pass through the display apparatus so that the display apparatus displays white. Alternatively, a protrusion (not shown) may be formed on the central portion of each of the transmission portions.

Figure 5A:
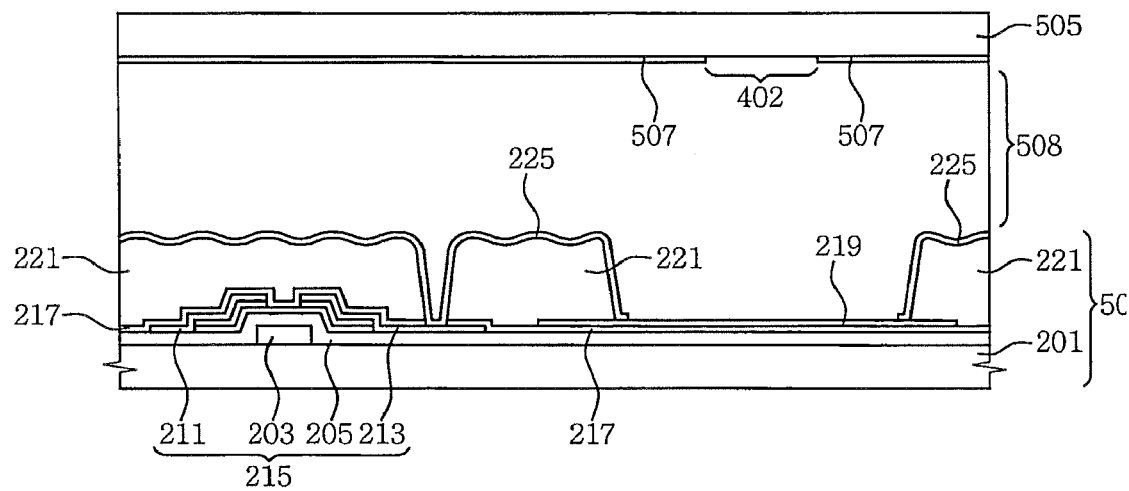
FIG. 5A is a cross-sectional view taken along the line III-III' shown in FIG. 4A.

FIG. 5A is a cross-sectional view taken along the line III-III' shown in FIG. 4A. Referring to FIG. 5A, a lower substrate 501 does not have any partition wall 223 such as that shown in FIG. 2A. An organic insulating material is coated on a passivation layer 217 and a first pixel electrode part 219, and the coated organic insulating material corresponding to a portion of a second electrode 213 and a transmission region Ta is removed to form an insulating layer 221. Alternatively, the first pixel electrode part 219 may be on the insulating layer 221 (as shown in FIG. 5C). An upper substrate 505 corresponding to the lower substrate 501 may further include a color filter (not shown) and a common electrode 507 that is on the surface of the upper substrate 505. The common electrode 507 has a pattern 402 corresponding to the transmission region Ta of the lower substrate 501. The pattern 402 has the elliptical shape that is extended in a longitudinal direction with respect to the transmission region Ta (as shown in FIG. 4A). Alternatively, the pattern 402 may have the polygonal shape, the circular shape, etc. (as shown in FIGS. 4B and 4C). Alternatively, the common electrode 507 may not have the pattern 402, but a protrusion (not shown) may be formed on the common electrode 507 corresponding to the central portion of the transmission region Ta.

The common electrode 507 of the display apparatus shown in FIG. 5A has the pattern 402 so that an alignment of a liquid crystal layer 508 is changed to form a multi-domain in the liquid crystal layer 508, thereby improving an image display quality of the display apparatus.

Figure 5B:
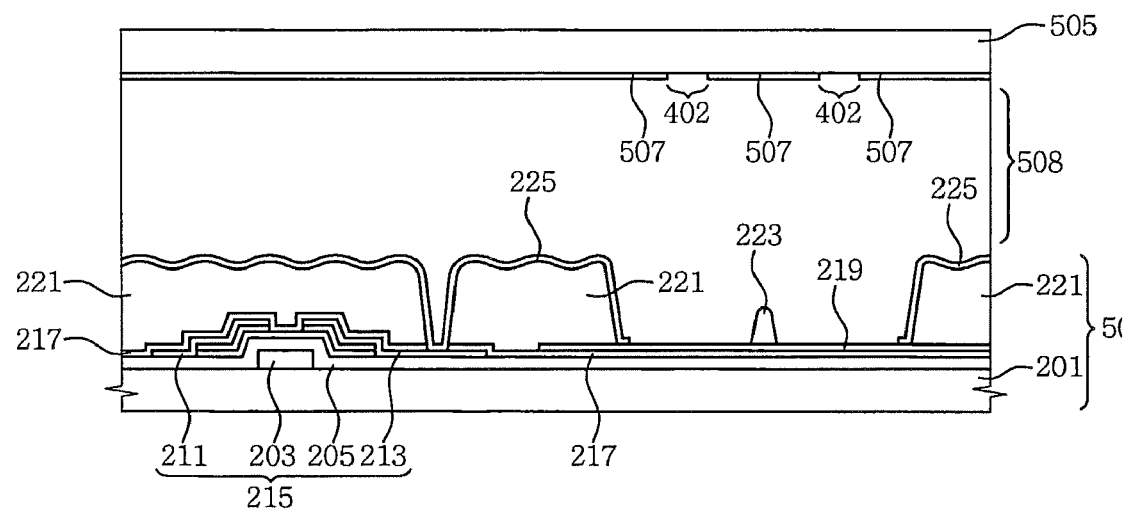
FIG. 5B is a cross-sectional view taken along the line IV-IV' shown in FIG. 4B.
Figure 5C:
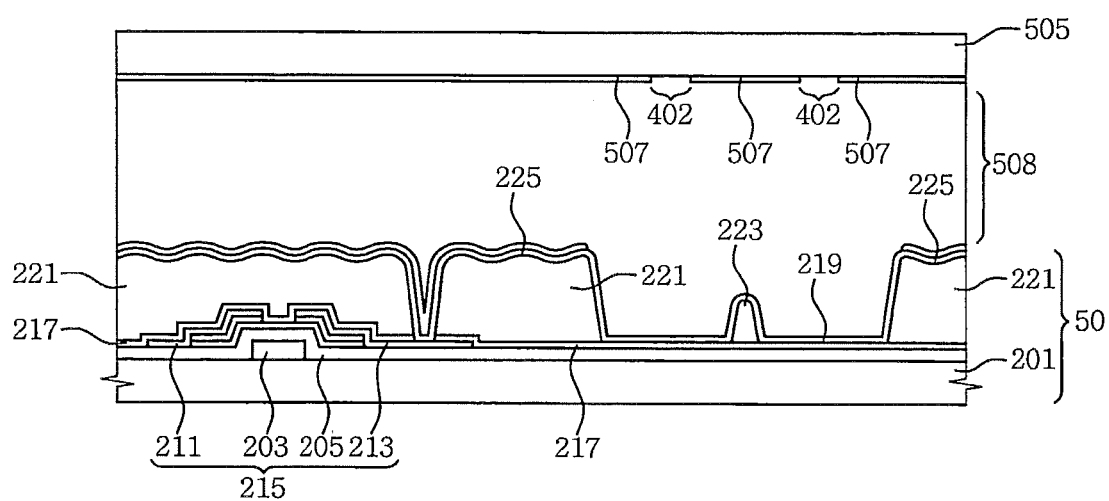
FIG. 5C is a cross-sectional view taken along the line V-V' shown in FIG. 4C.

FIG. 5B is a cross-sectional view taken along the line IV-IV' shown in FIG. 4B. FIG. 5C is a cross-sectional view taken along the line V-V' shown in FIG. 4C. Lower substrates of FIGS. 5B and 5C are substantially the same as in FIGS. 2A and 2B. In addition, upper substrates and common electrodes of FIGS. 5B and 5C are substantially the same as in FIG. 5A except for shape and number of patterns. Thus, the same reference numerals will be used to refer to the same or like parts as those described in FIGS. 2A, 2B, and 5A and further explanation will be omitted.

Referring to FIGS. 5B and 5C, the common electrode 507 has the patterns 402 corresponding to transmission portions. In this embodiment, each of the patterns 402 of the common electrode 507 is spaced apart from partition wall 223, and corresponds to a central portion of each of the transmission portions. A transmission region is divided into a plurality of the transmission portions by the partition wall 223. Each of the patterns 402 has an elliptical shape, a polygonal shape, a circular shape, etc. Alternatively, a plurality of the patterns may correspond to each of the transmission portions. Alternatively, the common electrode 507 may not have the patterns 402, but a plurality of protrusions (not shown) may be on the common electrode 507 corresponding to the central portion of each of the transmission portions.

The bottom substrate of each of the display apparatuses shown in FIGS. 5B and 5C includes the partition wall 223, a stepped portion between the transmission region and a reflection region, and an embossed portion in the reflection region so that liquid crystal molecules of a liquid crystal layer 508 are inclined by a predetermined angle. In addition, the common electrode 507 has the patterns 402 so that an alignment of the liquid crystal layer 508 is altered. Furthermore, locations of the partition wall 223 and the patterns 402 are optimized so that the liquid crystal layer 508 may be easily controlled to improve an image display quality of the display apparatus. Also, the display apparatus may be manufactured without a rubbing process so that a yield of the display apparatus is increased while the manufacturing cost of the display apparatus is decreased.

Figure 6:
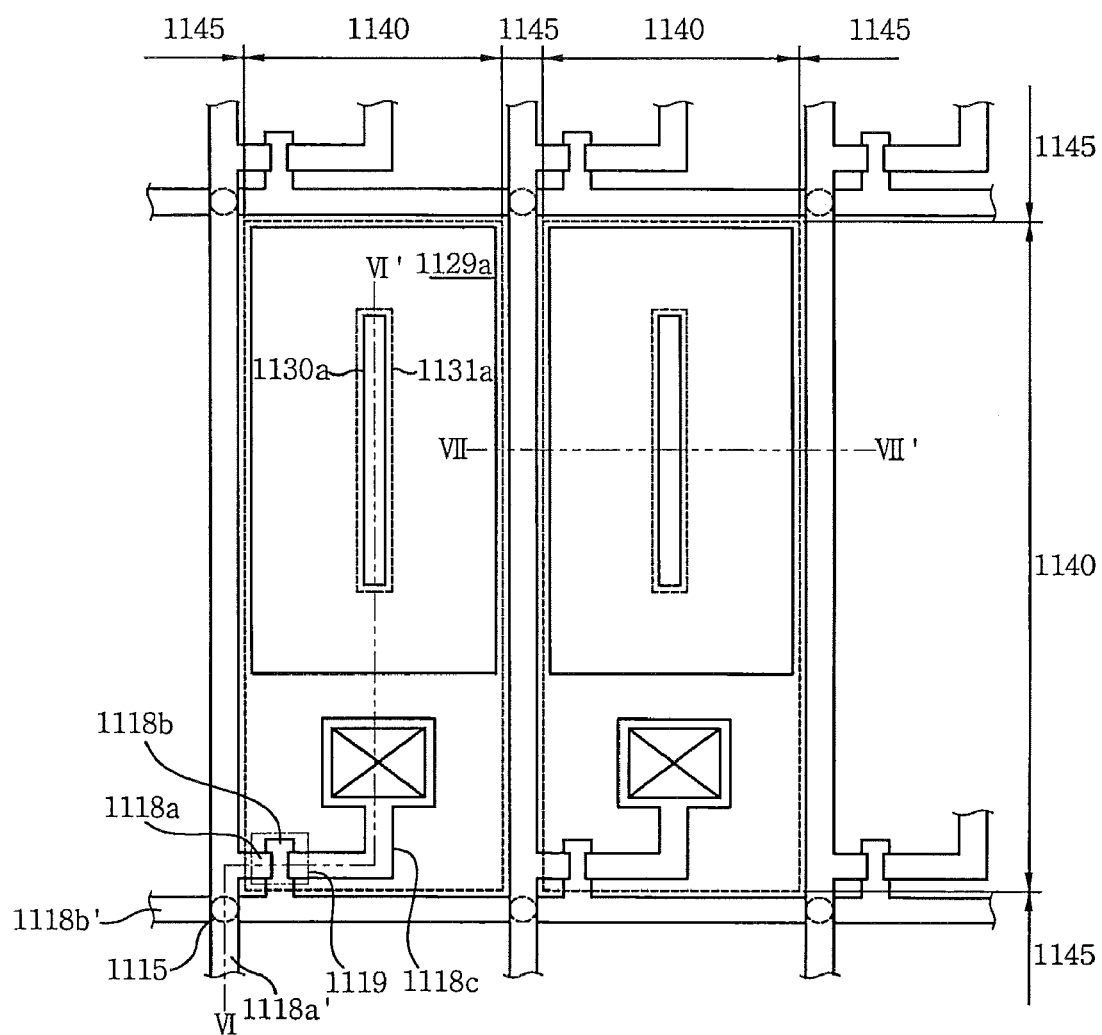
FIG. 6 is a plan view showing an LCD apparatus in accordance with an embodiment of the present invention.
Figure 7:
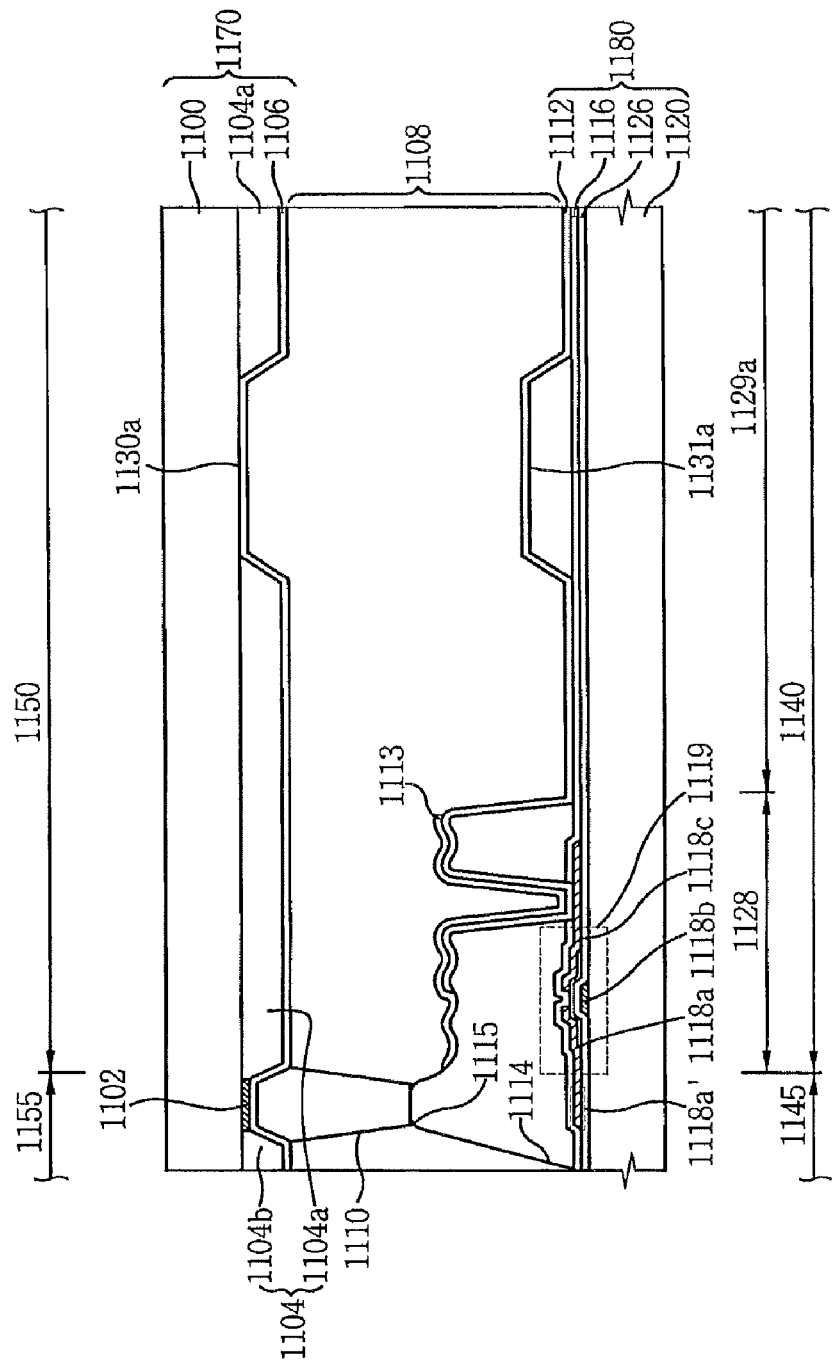
FIG. 7 is a cross-sectional view taken along the line VI-VI' shown in FIG. 6.
Figure 8:
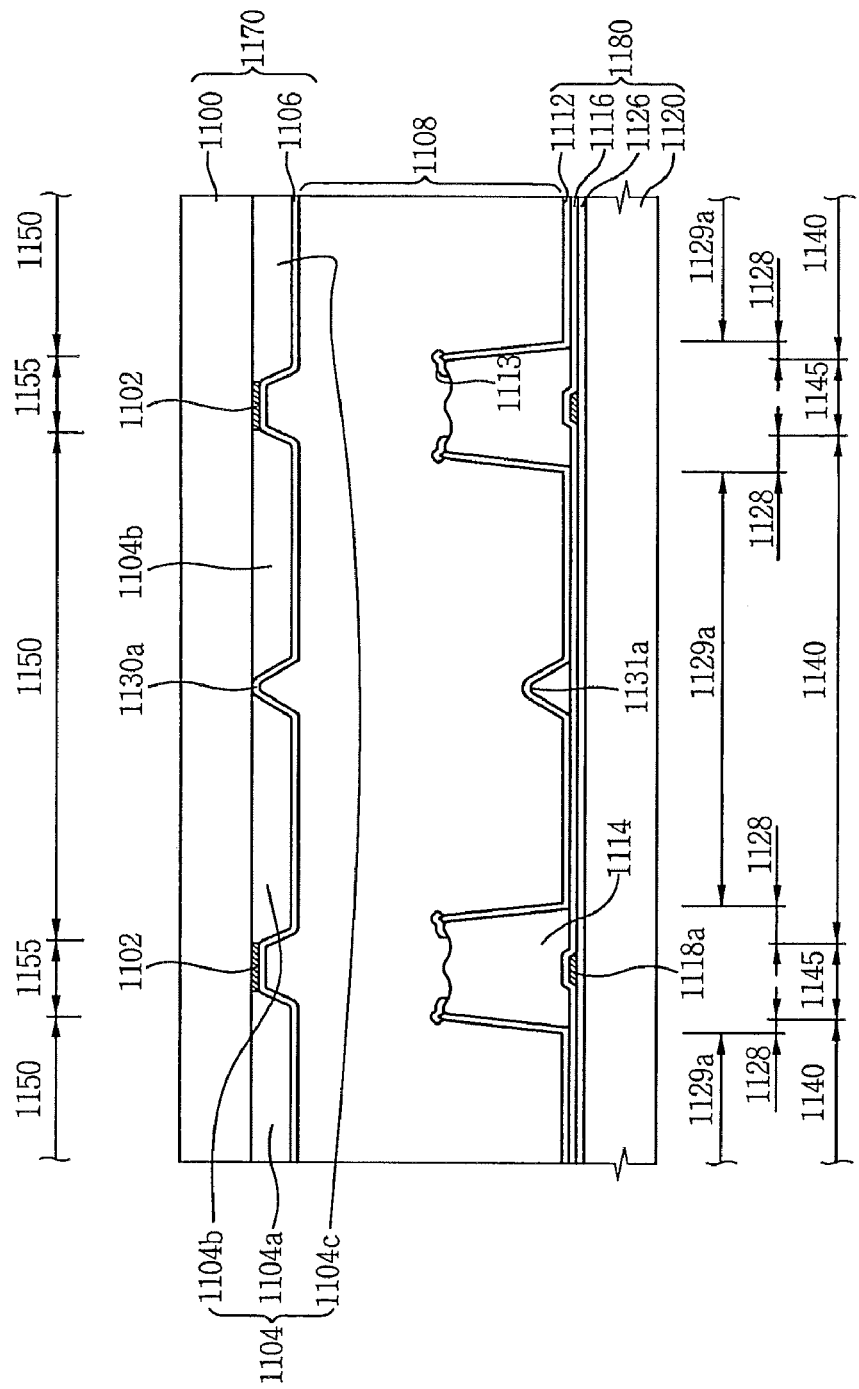
FIG. 8 is a cross-sectional view taken along the line VII-VII' shown in FIG. 6.

FIG. 6 is a plan view showing an LCD apparatus in accordance with an embodiment of the present invention. FIG. 7 is a cross-sectional view taken along the line VI-VI' shown in FIG. 6. FIG. 8 is a cross-sectional view taken along the line VII-VII' shown in FIG. 6.

Referring to FIGS. 6 to 8, the LCD apparatus includes an upper substrate 1170, a lower substrate 1180, and a liquid crystal layer 1108.

The upper substrate 1170 includes a second plate 1100, a black matrix 1102, a color filter 1104, a common electrode 1106, a spacer 1110, and a recess 1130a for a multi-domain. The upper substrate 1170 may include a plurality of color filters, a plurality of spacers, and a plurality of recesses for the multi-domain. The upper substrate 1170 includes a display region 1150 in which an image is displayed and a peripheral region 1155 that surrounds the display region 1150. The upper substrate 1170 may include a plurality of the display regions 1150.

The lower substrate 1180 includes a first plate 1120, a thin film transistor 1119, a source line 1118a', a gate line 1118b', a gate insulating layer 1126, a passivation layer 1116, a storage capacitor (not shown), an organic layer 1114, a first pixel electrode part 1112, a second pixel electrode part 1113, and a protrusion 1131a for the multi-domain. The lower substrate 1180 may include a plurality of the thin film transistors 1119, a plurality of source lines 1118a', a plurality of gate lines 1118b', a plurality of storage capacitors, a plurality of first pixel electrode parts 1112, a plurality of second pixel electrode parts 1113, and a plurality of protrusions 1131a for the multi-domain. The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129a through which a light generated from a backlight assembly (not shown) passes and a reflection region 1128 from which a light that is provided from an exterior to the upper substrate 1170 is reflected. In this embodiment, the transmission window 1129a has a quadrangular shape.

In one example, the first and second plates 1100 and 1120 include a transparent glass through which light may pass. The first and second plates 1100 and 1120 do not include alkaline ion in accordance with an embodiment of the present invention. Disadvantageously, if the first and second plates 1100 and 1120 include alkaline ions, the alkaline ions may be dissolved in the liquid crystal layer 1108 to decrease a resistivity of the liquid crystal layer 1108, thereby decreasing an image display quality and an adhesive strength between a sealant and the plates 1100 and 1120. In addition, characteristics of the thin film transistor 1119 may be deteriorated.

Alternatively, the first and second plates 1100 and 1120 may include triacetylcellulose (TAC), polycarbonate (PC), polyethersulfone (PES), polyethyleneterephthalate (PET), polyethylenenaphthalate (PEN), polyvinylalcohol (PVA), polymethylmethacrylate (PMMA), cyclo-olefin polymer (COP), etc.

The first and second plates 1100 and 1120 are optically isotropic. Alternatively, the first and second plates 1100 and 1120 may be optically anisotropic.

The black matrix 1102 is in the peripheral region 1155 of the second plate 1100 to block the light. The black matrix 1102 blocks the light passing through the blocking region 1145 to improve the image display quality.

A metallic material or an opaque organic material is deposited on the second plate 1100 and etched to form the black matrix 1102. The metallic material of the black matrix 1102 includes chrome (Cr), chrome oxide (CrOx), chrome nitride (CrNx), etc. The opaque organic material includes carbon black, a pigment compound, a colorant compound, etc. The pigment compound may include a red pigment, a green pigment, and a blue pigment, and the colorant compound may include a red colorant, a green colorant, and a blue colorant. Alternatively, the opaque organic material comprising photoresist may be coated on the second plate 1100 to form the black matrix 1102 through a photo process on the coated photoresist. Edges of a plurality of the color filters may also be overlapped with one another to form the black matrix 1102.

The color filter 1104 is formed in the display region 1150 of the second plate 1100 having the black matrix 1102 so that the light having a predetermined wavelength may pass through the color filter 1104. The color filter 1104 includes a red color filter portion 1104a, a green color filter portion 1104b, and a blue color filter portion 1104c. The color filter 1104 includes a photo initiator, a monomer, a binder, a pigment, a dispersant, a solvent, a photoresist, etc. The color filter 1104 may be on the first plate 1120 or the passivation layer 1116.

The color filter 1104 has the recess 1130a for the multi-domain so that the multi-domain is formed in the liquid crystal layer 1108. A portion of the color filter 1104 is removed to form the recess 1130a for the multi-domain. The recess 1130a for the multi-domain corresponds to the transmission window 1129a. In this embodiment, the recess 1130a for the multi-domain is formed on a central line of the transmission window 1129a, and the recess 1130a for the multi-domain has a rectangular shape that is extended in a direction substantially parallel with the central line. A depth of the recess 1130a for the multi-domain is substantially equal to a thickness of the color filter 1104. Alternatively, the depth of the recess 1130a may be less than the thickness of the color filter 1104.

The common electrode 1106 is formed over the second plate 1100 having the black matrix 1102 and the color filter 1104. The common electrode 1106 includes a transparent conductive material, for example, indium tin oxide (ITO), indium zinc oxide (IZO), zinc oxide (ZO), etc. Alternatively, the common electrode 1106 may be formed to be substantially parallel with the first pixel electrode part 1112 and the second pixel electrode part 1113.

The spacer 1110 is formed on the second plate 1100 having the black matrix 1102, the color filter 1104, and the common electrode 1106. The upper substrate 1170 is spaced apart from the lower substrate 1180 by the spacer 1110. In this embodiment, the spacer 1110 is at a position corresponding to the black matrix 1102, and has a column shape. Alternatively, the spacer 1110 may have a variety of shapes, including but not limited to a ball shaped spacer or a mixture of the column shaped spacer and the ball shaped spacer.

The thin film transistor 1119 is in the reflection region 1128 of the first plate 1120, and includes a source electrode 1118a, a gate electrode 1118b, a drain electrode 1118c and a semiconductor layer pattern. A driving integrated circuit (not shown) applies a data voltage to the source electrode 1118a through the source line 1118a', and applies a gate signal to the gate electrode 1118b through the gate line 1118b'.

The gate insulating layer 1126 is formed over the first plate 1120 having the gate electrode 1118b so that the gate electrode 1118b is electrically insulated from the source electrode 1118a and the drain electrode 1118c. The gate insulating layer 1126 may include silicon oxide (SiOx), silicon nitride (SiNx), etc.

The passivation layer 1116 is over the first plate 1120 having the thin film transistor 1119. The passivation layer 1116 has a contact hole. The drain electrode 1118c is partially exposed through the contact hole. The passivation layer 1116 may include silicon oxide, the silicon nitride, etc.

The storage capacitor (not shown) is formed on the first plate 1120 to maintain a voltage difference between the second pixel electrode part 1113 and the common electrode 1106 and a voltage difference between the first pixel electrode part 1112 and the common electrode 1106.

The organic layer 1114 is on the first plate 1120 having the thin film transistor 1119 and the passivation layer 1116 so that the thin film transistor 1119 is electrically insulated from the first pixel electrode part 1112 and the second pixel electrode part 1113. The organic layer 1114 has a contact hole through which the drain electrode 1118c is partially exposed.

The organic layer 1114 defines the transmission window 1129a, and the transmission window 1129a is opened so that the lower substrate 1180 corresponding to the reflection region 1128 has different height from the lower substrate 1180 corresponding to the transmission window 1129a. Alternatively, a portion of the organic layer 1114 may remain in the transmission window 1129a.

The organic layer 1114 includes a protruded portion 1115 and an embossed portion. The protruded portion 1115 corresponds to the spacer 1110 so that an alignment of the liquid crystal layer 1108 is controlled. The embossed portion is in the reflection region 1128 to improve a reflectivity of the second pixel electrode part 1113.

The protrusion 1131a for the multi-domain is formed on the passivation layer 1116 corresponding to the recess 1130a for the multi-domain. The protrusion 1131a has a quadrangular shape that is extended in a direction that is substantially parallel with the source line 1118a'. Alternatively, a plurality of the protrusions for the multi-domain may correspond to a single recess for the multi-domain. A plurality of recesses for the multi-domain may correspond to a single protrusion for the multi-domain. In this embodiment, the protrusion 1131a for the multi-domain is formed from the same layer as the organic layer 1114.

Sizes of the protrusion 1131a and the recess 1130a for the multi-domain are adjusted to control the alignment of the liquid crystal layer 1108.

The first pixel electrode part 1112 is formed on the organic layer 1114 corresponding to the pixel region 1140, an inner surface of the contact hole, a protrusion 1131a for the multi-domain, and the transmission window 1129a so that the first pixel electrode part 1112 is electrically connected to the drain electrode 1118c. When the voltage is applied to the first pixel electrode part 1112 and the common electrode 1106, the alignment of the liquid crystal layer 1108 is controlled so that a light transmittance of the liquid crystal layer 1108 varies. The first pixel electrode part 1112 includes a transparent conductive material such as indium tin oxide (ITO), indium zinc oxide (IZO), zinc oxide (ZO), etc.

The second pixel electrode part 1113 is on the organic layer 1114 corresponding to the reflection region 1128 so that the light is reflected from the second pixel electrode part 1113. In this embodiment, the second pixel electrode part 1113 is on the embossed portion so that the reflectivity viewed from a front of the LCD apparatus is increased. The second pixel electrode part 1113 includes a conductive material so that the second pixel electrode part 1113 is electrically connected to the drain electrode 1118c through the first pixel electrode part 1112.

Alignment layers (not shown) may be on the upper substrate 1170 and the lower substrate 1180 so that the alignment of the liquid crystal layer 1108 is controlled.

The liquid crystal layer 1108 is between the upper substrate 1170 and the lower substrate 1180, and the liquid crystal layer 1108 is sealed by a sealant (not shown). The liquid crystal layer 1108 may have a vertical alignment (VA) mode, a twisted nematic (TN) mode, a mixed twisted nematic (MTN) mode, a homogeneous alignment mode, etc. In this embodiment, the liquid crystal layer 1108 has the VA mode.

When the voltage is applied to the first pixel electrode part 1112, the second pixel electrode part 1113 and the common electrode 1106, electric fields formed in regions adjacent to the protruded portion 1115, the spacer 1110, the stepped portion between the transmission window 1129a, and the reflection region 1128, the recess 1130a and the protrusion 1131a for the multi-domain are distorted. Therefore, the multi-domain is formed in the liquid crystal layer 1108 to increase the viewing angle of the LCD apparatus.

FIGS. 9A to 9K are cross-sectional views showing a method of manufacturing the LCD apparatus shown in FIG. 6.

Figure 9A:
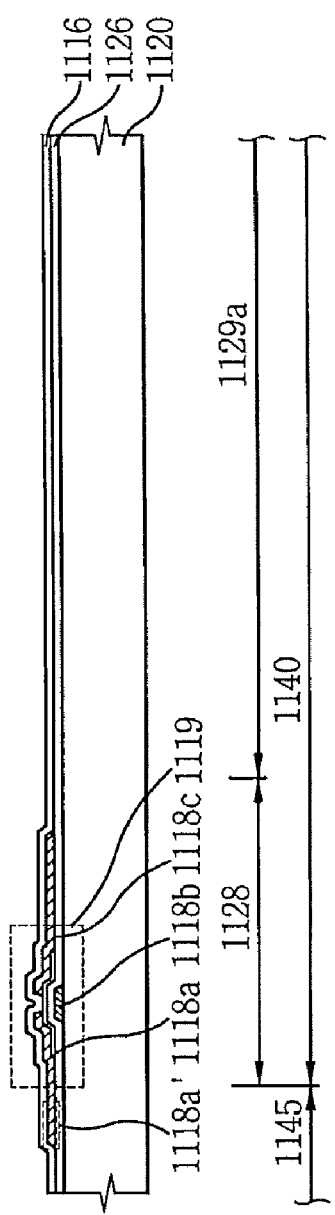

Referring to FIG. 9A, the pixel region 1140 and the blocking 1145 are defined on the first plate 1120. The pixel region 1140 includes the transmission window 1129a through which the light generated from the backlight assembly (not shown) passes and the reflection region 1128 from which the light that is provided from an exterior to the upper substrate 1170 (FIGS. 7 and 8) is reflected.

A conductive material is deposited on the first plate 1120. The deposited conductive material is partially removed to form the gate electrode 1118b and the gate line 1118b' (FIG. 6). The insulating material is deposited on the first plate 1120 to form the gate insulating layer 1126.

An amorphous silicon pattern and an N+ amorphous silicon pattern are formed on the gate insulating layer 1126 corresponding to the gate electrode 1118b to form the semiconductor layer. A conductive material is deposited on the gate insulating layer 1126 having the semiconductor layer. The deposited conductive material is partially etched to form the source electrode 1118a, the source line 1118a', and the drain electrode 1118c. Therefore, the thin film transistor 1119 having the source electrode 1118a, the gate electrode 1118b, the drain electrode 1118c, and the semiconductor layer is completed.

An insulating material is then deposited on the first plate 1120 having the thin film transistor 1119. In one embodiment, the insulating material includes a photoresist.

Figure 9B:
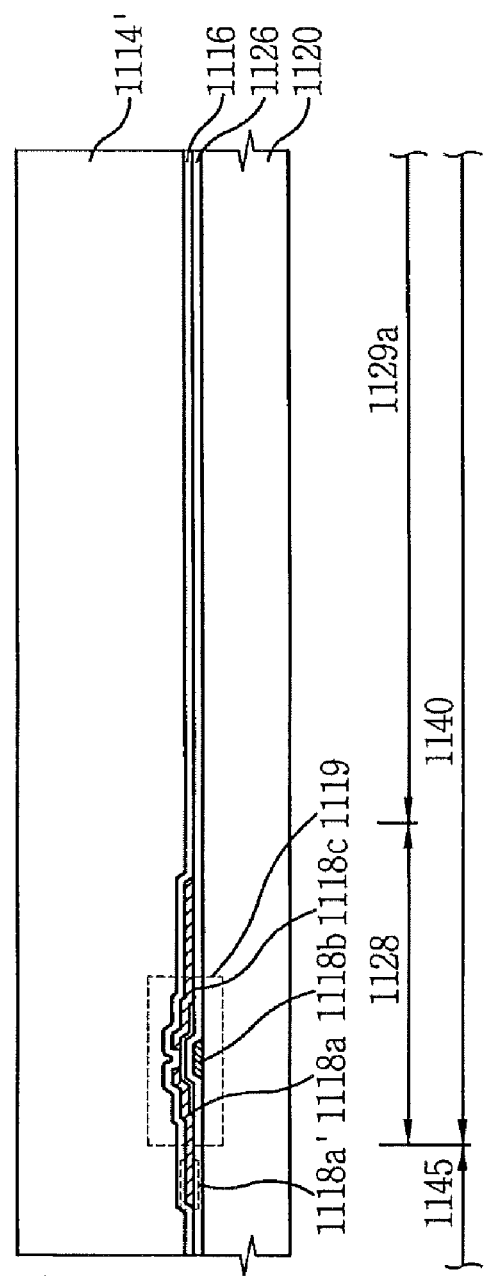

Referring to FIG. 9B, the organic material 1114' is coated on the insulating material.

Referring to FIG. 9C, the coated organic material 1114' is exposed through a mask to form organic layer 1114. The exposed organic material 1114' is developed to form the contact hole, the protruded portion 1115, the embossed portion, and the protrusion 1131a for the multi-domain. In addition, the coated organic material 1114' corresponding to the transmission window 1129a is opened. In this embodiment, the coated organic material 1114' is exposed using a single mask. Alternatively, the coated organic material may be exposed using a plurality of masks. The mask includes an opaque portion, translucent portions, and transparent portions. The opaque portion corresponds to the protruded portion 1115. The translucent portions correspond to the embossed portion and the protrusion 1131*a* for the multi-domain. The transparent portions correspond to the contact hole and the transmission window 1129*a*. Alternatively, the translucent portions may include a plurality of slits. A light transmittance of the translucent portion or widths of the slits are adjusted to control the size of the protrusion 1131*a* for the multi-domain.

Figure 9D:
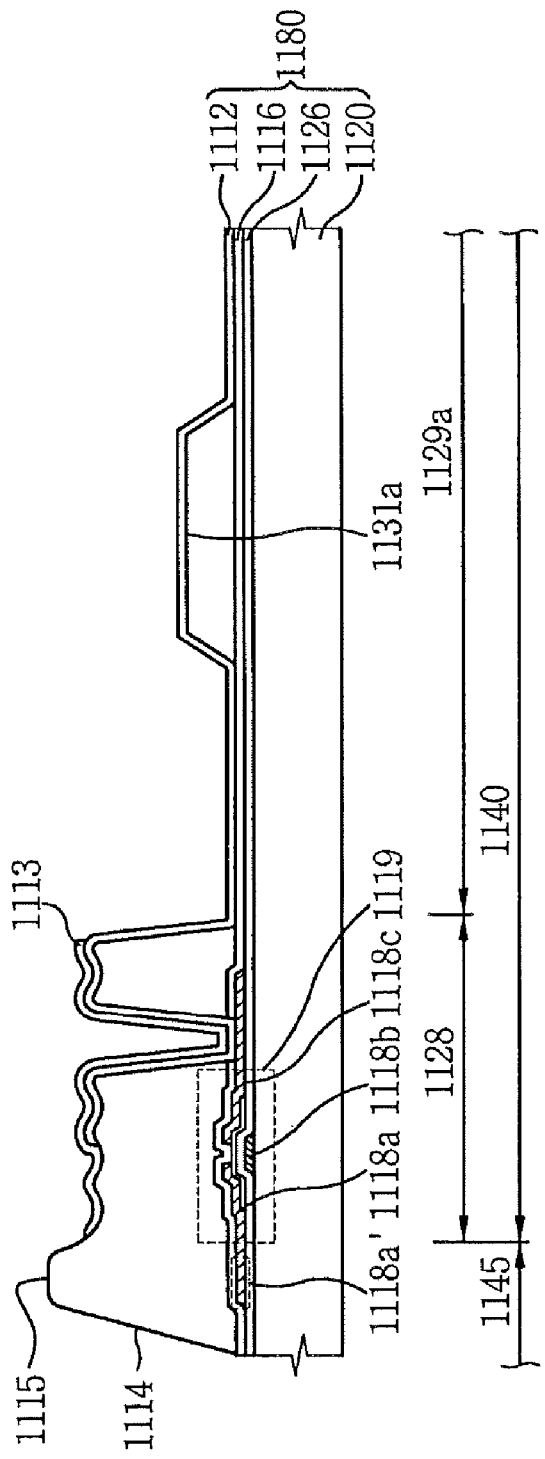

Referring to FIG. 9D, the transparent conductive material is deposited on the organic layer 1114, the passivation 1116, the inner surface of the contact hole, the transmission window 1129*a*, and the protrusion 1131*a* for the multi-domain. The transparent conductive material includes ITO, IZO, ZO, etc. In this embodiment, the transparent conductive material includes ITO. The deposited transparent conductive material is partially etched to form the first pixel electrode part 1112. The first pixel electrode part 1112 is in the pixel region 1140.

A conductive material having high reflectivity is deposited over the first plate 1120 including the first pixel electrode part 1112. In this embodiment, the conductive material includes aluminum and neodymium. The deposited conductive material is partially etched to form the second pixel electrode part 1113 in the reflection region 1128.

Alternatively, the second pixel electrode part 1113 may have a multi-layered structure. The second pixel electrode part 1113 may also have a molybdenum-tungsten alloy layer and an aluminum-neodymium alloy on the molybdenum-tungsten alloy layer. The second pixel electrode part 1113 is electrically connected to the drain electrode 1118*c* through the first pixel electrode part 1112 and the contact hole. Alternatively, the second pixel electrode part 1113 may be on the organic layer 1114 and the inner surface of the contact hole, and the first electrode part 1112 is on the transmission window 1129*a* and a portion of the second pixel electrode part 1113 so that the first pixel electrode part 1112 is electrically connected to the drain electrode 1118*c* through the second pixel electrode part 1113.

Therefore, the lower substrate 1180 having the first plate 1120, the thin film transistor 1119, the source line 1118*a*', the gate line 1118*b*', the organic layer 1114, the first pixel electrode part 1112, the second pixel electrode part 1113, and the protrusion 1131*a* for the multi-domain is completed.

Figure 9E:
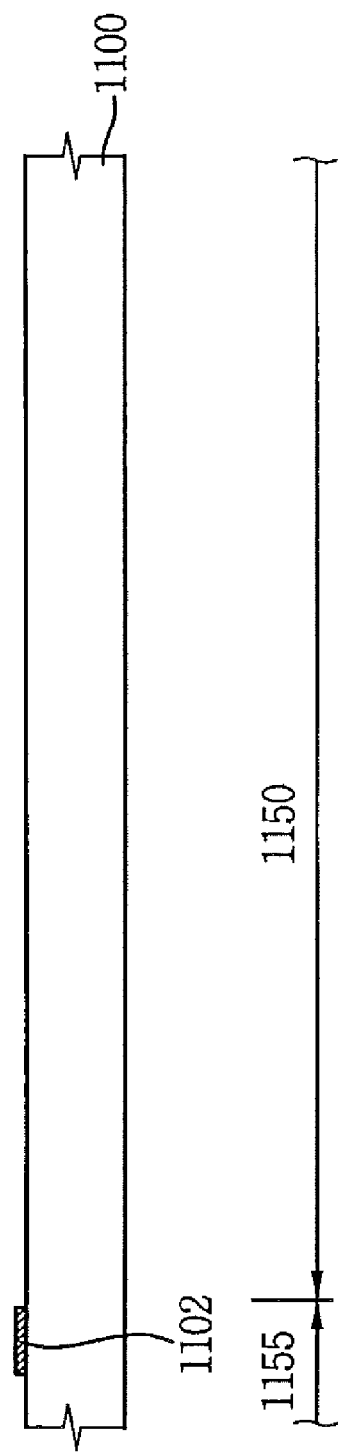

Referring to FIG. 9E, the metallic material is deposited on the second plate 1100. The deposited metallic material is partially etched to form the black matrix 1102. Alternatively, the opaque organic material may be coated on the second plate 1100, and the coated opaque organic material may be partially removed through photo process to form the black matrix 1102. The photo process includes an exposure process and a development process. Alternatively, the black matrix 1102 may be formed on the first plate 1120.

Figure 9F:
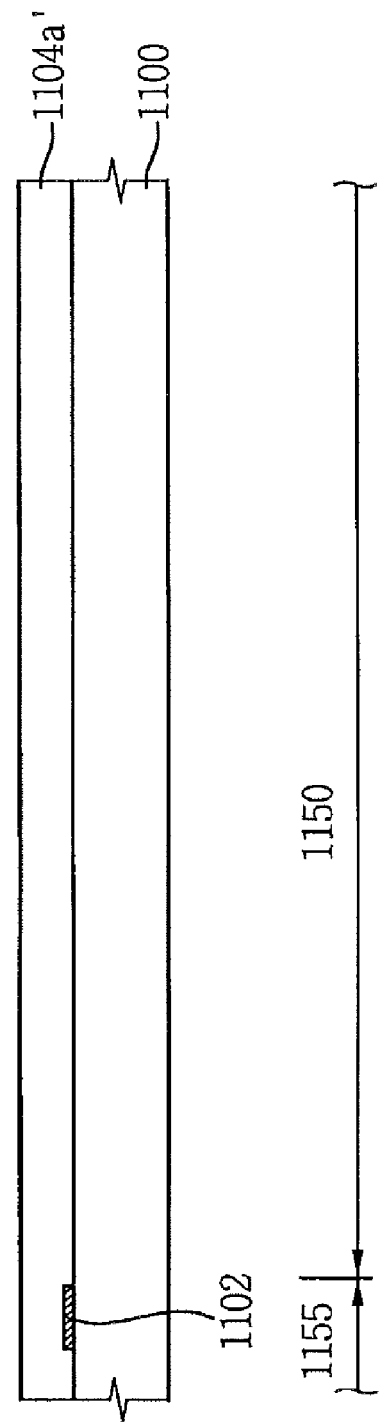

Referring to FIG. 9F, a mixture 1104*a*' of a red colorant and photoresist is coated on the second plate 1100 having the black matrix 1102.

Figure 9G:
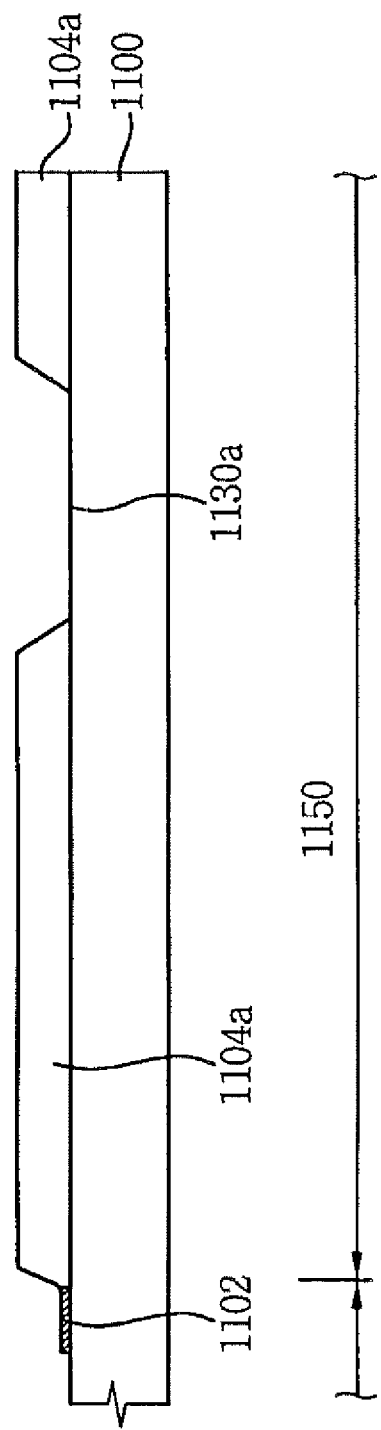

Referring to FIG. 9G, the coated mixture 1104*a*' shown in FIG. 9F is exposed using a mask and developed to form the red color filter portion 1104*a* and the recess 1130*a* for the multi-domain. The mask includes a slit corresponding to the recess 1130*a* for the multi-domain. The size of the recess 1130*a* for the multi-domain is determined by the size of the slit. Alternatively, the mask may include a translucent portion. The size of the recess 1130*a* for the multi-domain may be determined by the size of the translucent portion.

Figure 9H:
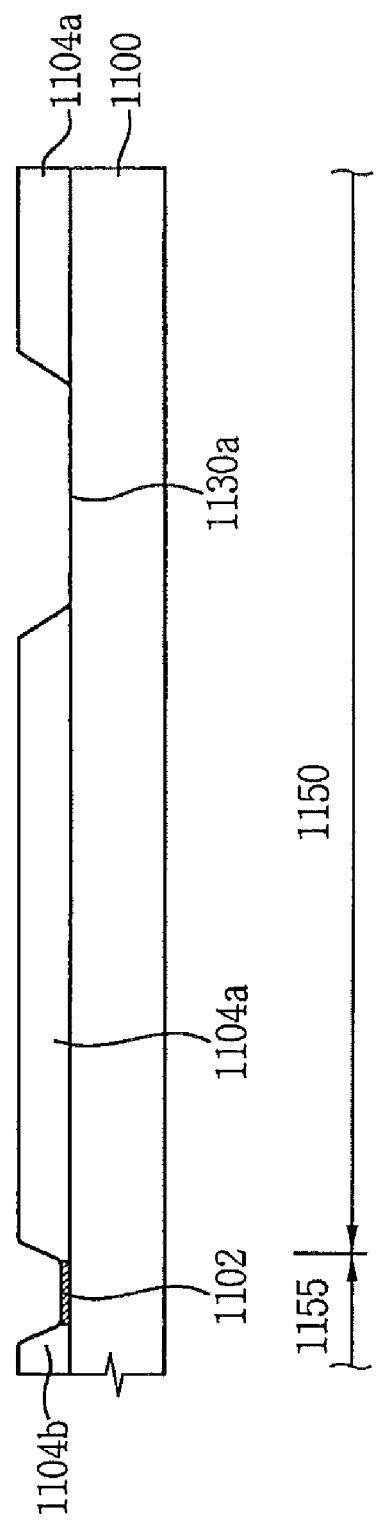

Referring to FIG. 9H, the green color filter portion 1104*b* and the blue color filter portion 1104*c* shown in FIG. 8 are formed on the second plate 1100 having the black matrix 1102 and the red color filter portion 1104*a*.

Figure 9I:
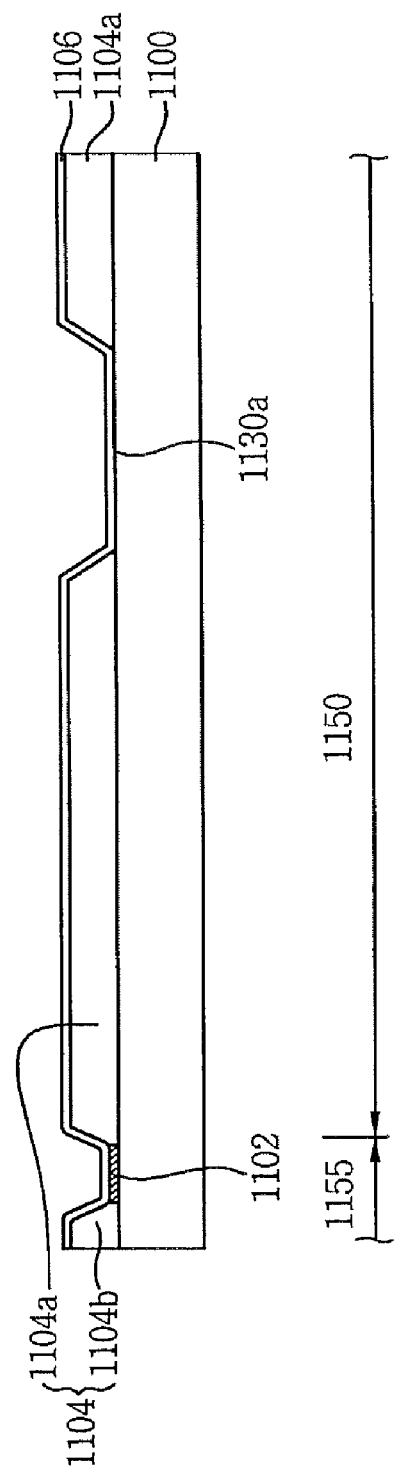

Referring to FIG. 9I, the transparent conductive material is deposited on the second plate 1100 having the black matrix 1102 and the color filter 1104 to form the common electrode 1106.

Figure 9J:
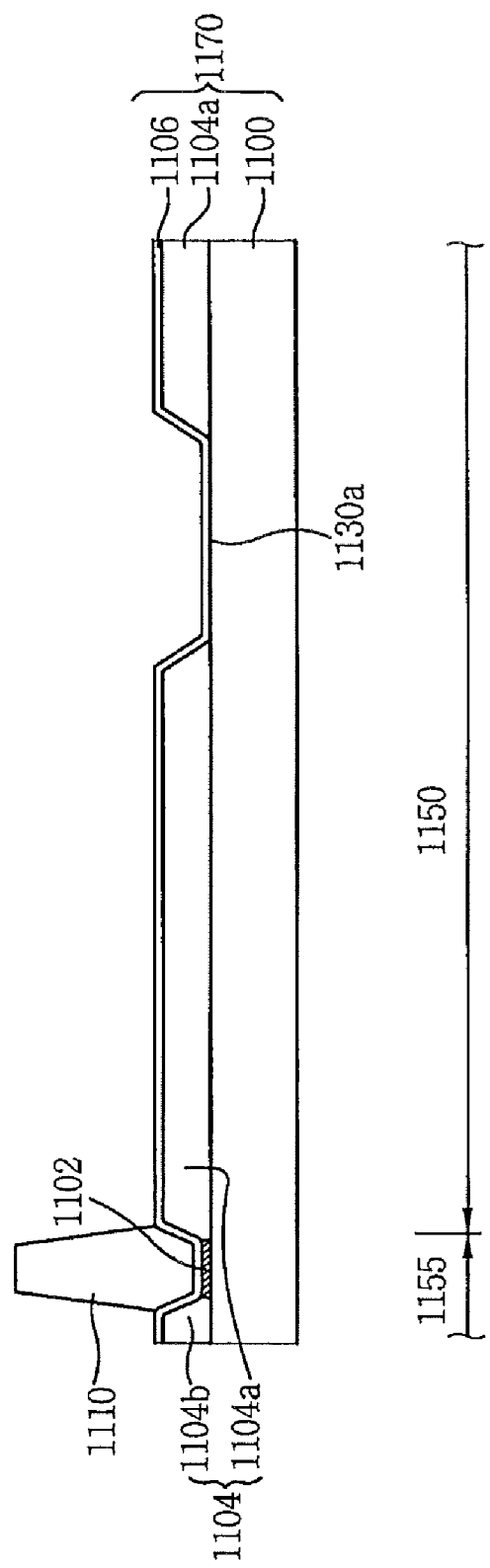

Referring to FIG. 9J, an organic material is coated on the common electrode 1106. In this embodiment, the organic material includes photoresist. The coated organic material is exposed and developed to form the spacer 1110 on the common electrode 1106 corresponding to the black matrix 1102. Alternatively, the spacer 1110 may be formed on the first plate 1120.

Figure 9K:
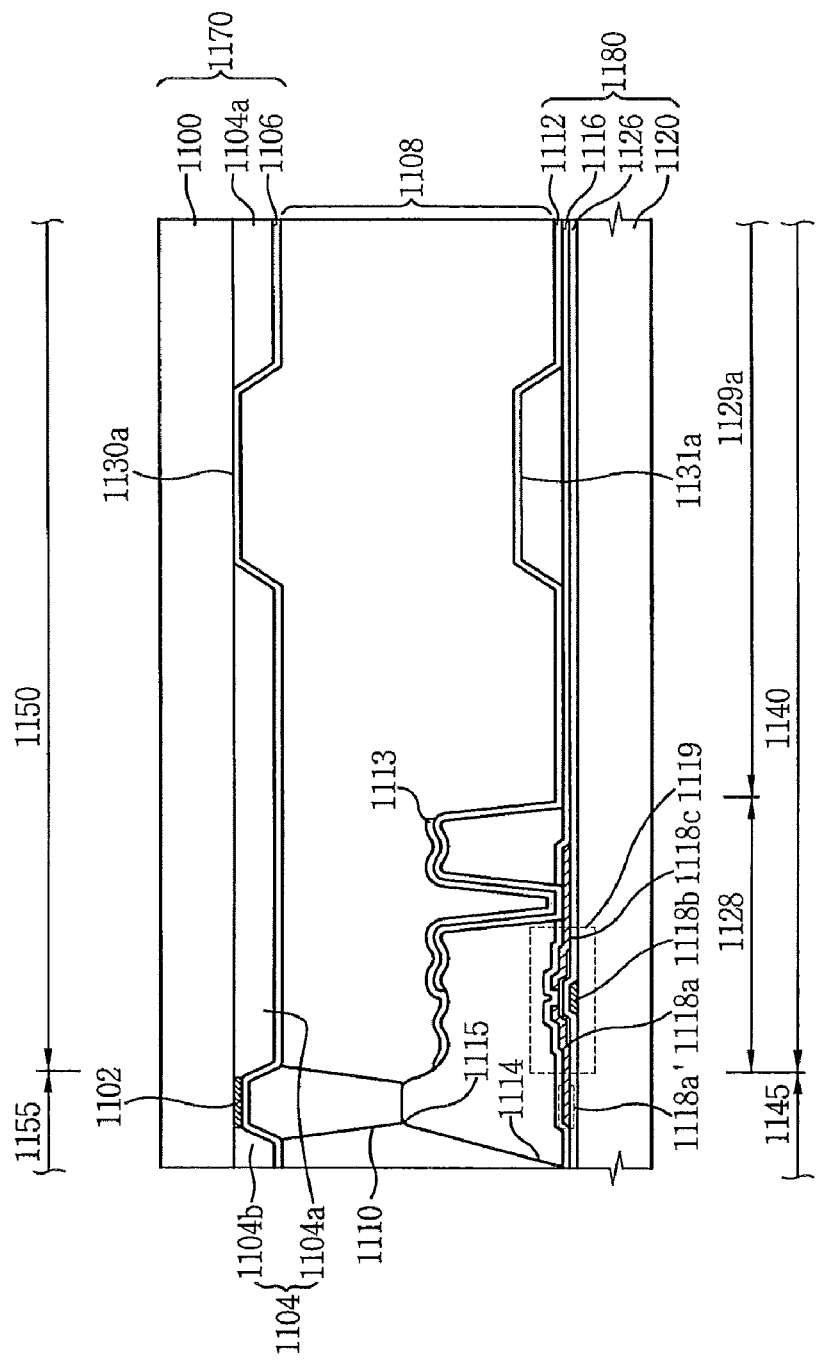

Referring to FIG. 9K, the upper substrate 1170 is combined with the lower substrate 1180.

The liquid crystal layer 1108 is formed between the upper substrate 1170 and the lower substrate 1180, and the liquid crystal layer 1108 is sealed by a sealant (not shown). Liquid crystal may be dropped on the upper substrate 1170 having the sealant (not shown), and the lower substrate 1180 may be combined with the upper substrate 1170 to provide the liquid crystal layer 1108. Alternatively, the liquid crystal may also be dropped on the lower substrate 1180 having the sealant (not shown), and the upper substrate 1170 may be combined with the lower substrate 1180.

According to this embodiment, the alignment of the liquid crystal layer 1108 in the regions adjacent to the protruded portion 1115, the spacer 1110, the stepped portion between the transmission window 1129*a* and the reflection region 1128, the recess 1130*a* for the multi-domain, and the protrusion 1131*a* for the multi-domain are controlled to form the multi-domain in the transmission window 1129*a*. The center of the multi-domain corresponds to the recess 1130*a* for the multi-domain and the protrusion 1131*a* for the multi-domain.

Figure 10:
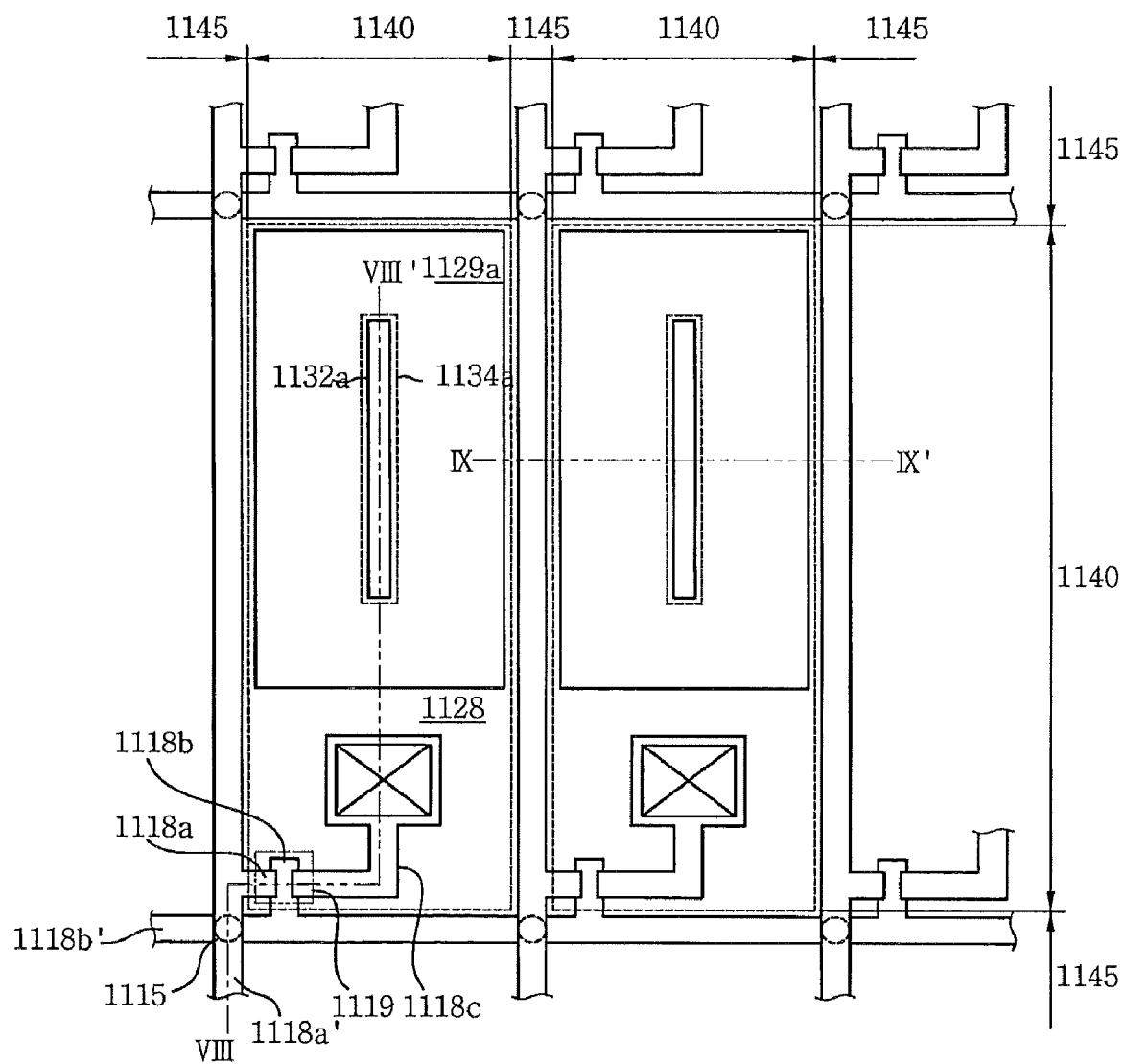
FIG. 10 is a plan view showing an LCD apparatus in accordance with another embodiment of the present invention.
Figure 11:
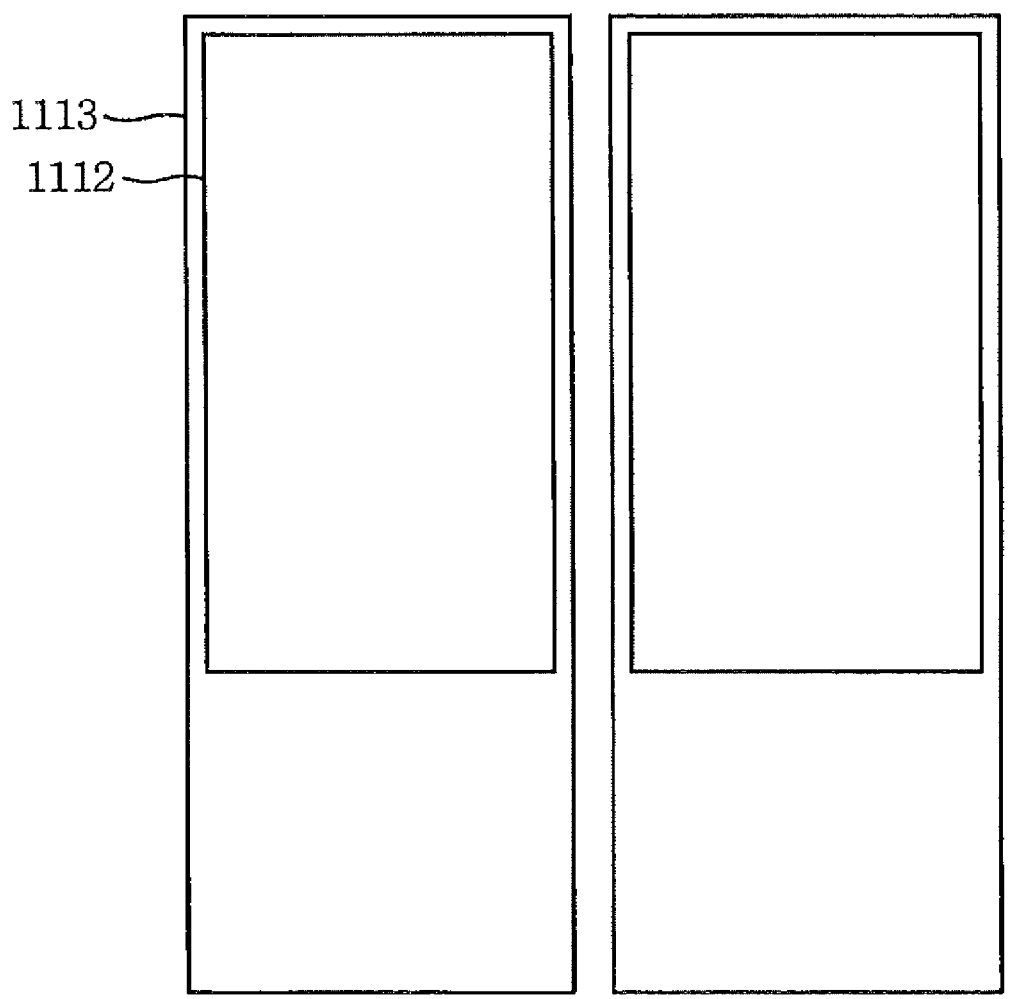
FIG. 11 is a plan view showing a first pixel electrode part and a second pixel electrode part shown in FIG. 10.
Figure 12:
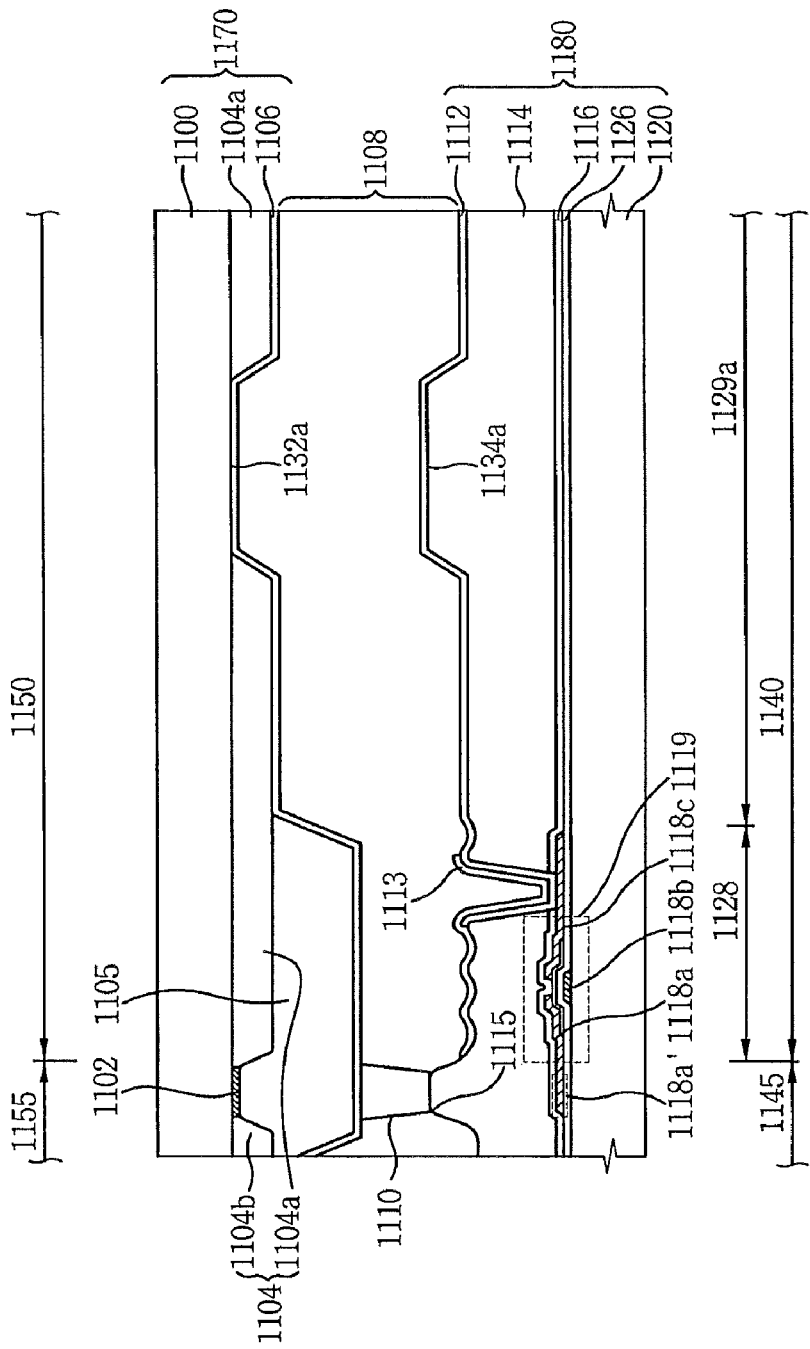
FIG. 12 is a cross-sectional view taken along the line VIII-VIII' shown in FIG. 10.
Figure 13:
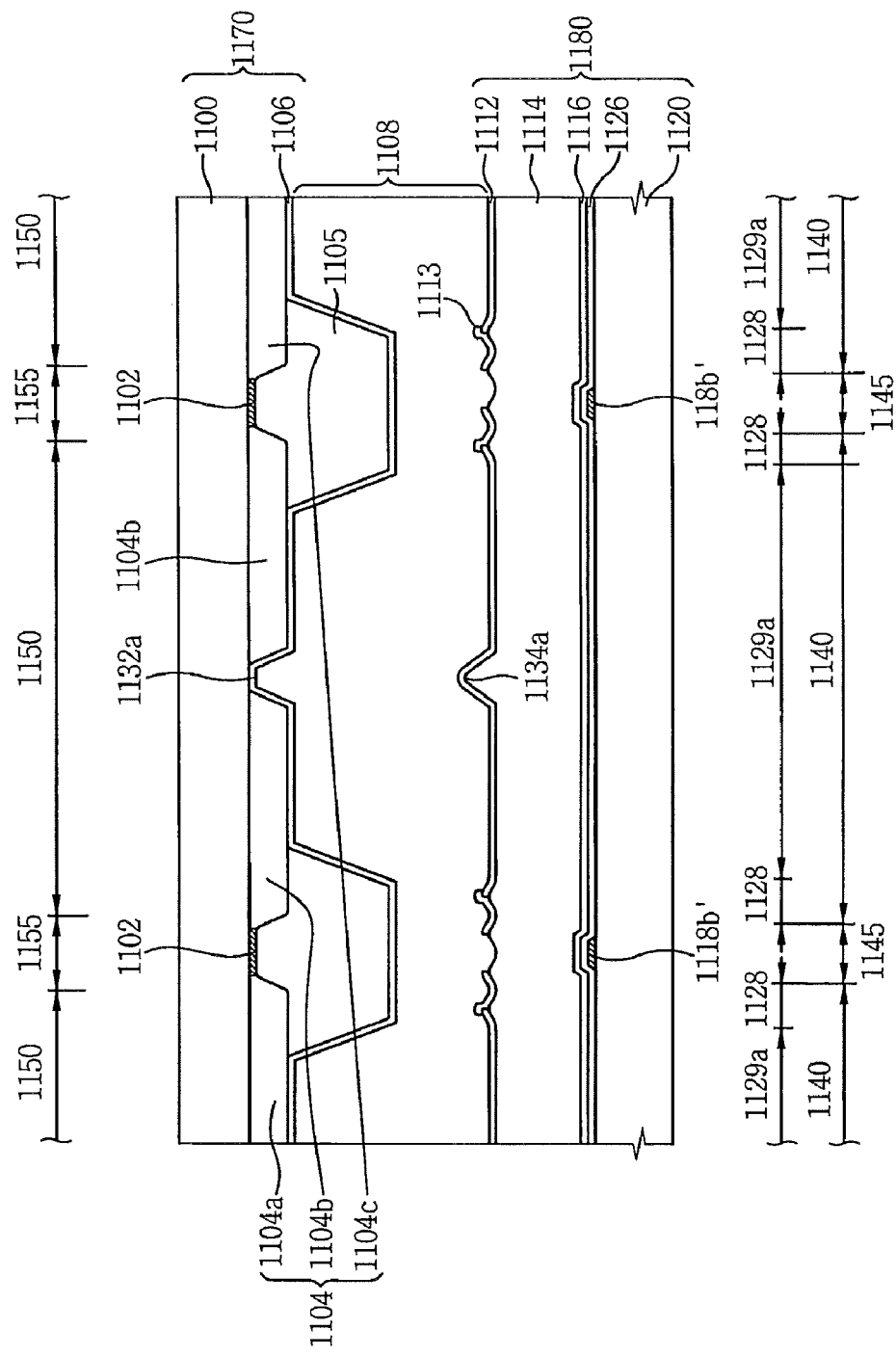
FIG. 13 is a cross-sectional view taken along the line IX-IX' shown in FIG. 10.

FIG. 10 is a plan view showing an LCD apparatus in accordance with another embodiment of the present invention. FIG. 11 is a plan view showing a first pixel electrode part and a second pixel electrode part shown in FIG. 10. FIG. 12 is a cross-sectional view taken along the line VIII-VIII' shown in FIG. 10. FIG. 13 is a cross-sectional view taken along the line IX-IX' shown in FIG. 10.

The LCD apparatus of FIGS. 10 to 13 is substantially the same as the apparatus shown in FIGS. 6 to 8 except for an overcoating layer and organic layer. Thus, the same reference numerals will be used to refer to the same or like parts as those described in FIGS. 6 to 8 and further explanation regarding similar parts will be omitted.

Referring to FIGS. 10 to 13, the LCD apparatus includes an upper substrate 1170, a lower substrate 1180, and a liquid crystal layer 1108.

The upper substrate 1170 includes a second plate 1100, a black matrix 1102, a color filter 1104, an overcoating layer 1105, a common electrode 1106, a spacer 1110, and a recess 1132*a* for a multi-domain. The upper substrate 1170 may include a plurality of the color filters, a plurality of the spacers, and a plurality of the recesses for the multi-domain. The upper substrate 1170 includes a display region 1150 and a peripheral region 1155 that surrounds the display region 1150. The upper substrate 1170 may include a plurality of the display regions.

The lower substrate 1180 includes a first plate 1120, a thin film transistor 1119, a source line 1118*a*', a gate line 1118*b*', a gate insulating layer 1126, a passivation layer 1116, a storage capacitor (not shown), an organic layer 1114, a first pixel electrode part 1112, a second pixel electrode part 1113, and a protrusion 1134*a* for the multi-domain. The lower substrate 1180 may include a plurality of the thin film transistors, a plurality of the source lines, a plurality of the gate lines, a plurality of the storage capacitors, a plurality of the first pixel electrode parts, a plurality of the second pixel electrode parts, and a plurality of the protrusions for the multi-domain. The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129a through which a light generated from a backlight assembly (not shown) passes and a reflection region 1128 on which a light that is provided from an exterior is reflected to the upper substrate 1170.

The black matrix 1102 is in the peripheral region 1155 of the second plate 1100 to block the light.

The color filter 1104 is formed in the display region 1150 of the second plate 1100 having the black matrix 1102 so that the light having a predetermined wavelength may pass through the color filter 1104. The color filter 1104 includes a red color filter portion 1104a, a green color filter portion 1104b, and a blue color filter portion 1104c.

The color filter 1104 includes the recess 1132a for the multi-domain so that the multi-domain is formed in the liquid crystal layer 1108. A portion of the color filter 1104 is removed to form the recess 1132a for the multi-domain. The recess 1132a for the multi-domain corresponds to the transmission window 1129a. In this embodiment, the recess 1132a for the multi-domain is on a central line of the transmission window 1129a, and the recess 1132a for the multi-domain has a rectangular shape that is extended in a direction substantially parallel with the central line. A depth of the recess 1132a for the multi-domain is substantially equal to a thickness of the color filter 1104. Alternatively, the depth of the recess 1132a may be less than the thickness of the color filter 1104.

The overcoating layer 1105 is on the second plate 1100 having the black matrix 1102 and the color filter 1104 to protect the black matrix 1102 and the color filter 1104 from an impact that is provided from an exterior to the upper substrate 1170. Also, the overcoating layer 1105 planarizes a surface of the upper substrate 1170.

The overcoating layer 1105 corresponding to the transmission window 1129a is opened so that the upper substrate 1170 corresponding to the transmission window 1129a has different height from the upper substrate 1170 corresponding to the reflection region 1128. Alternatively, an embossed portion may be formed on the overcoating layer 1105 corresponding to the reflection region 1128.

A portion of the overcoating layer 1105 may remain on the color filter 1104 and the recess 1132a for the multi-domain corresponding to the transmission window 1129a. The remaining overcoating layer 1105 may be along the color filter 1104 and the recess 1132a for the multi-domain.

The common electrode 1106 is formed on the second plate 1100 having the black matrix 1102, the color filter 1104, and the overcoating layer 1105.

The spacer 1110 is formed over the second plate 1100 having the black matrix 1102, the color filter 1104, the overcoating layer 1105, and the common electrode 1106. In one example, the spacer 1110 includes the column spacer on the common electrode 1106 corresponding to the black matrix 1102.

The thin film transistor 1119 is formed in the reflection region 1128 of the first plate 1120. The thin film transistor 1119 includes a source electrode 1118a, a gate electrode 1118b, a drain electrode 1118c, and a semiconductor layer pattern.

The gate insulating layer 1126 is on the first plate 1120 having the gate electrode 1118b so that the gate electrode 1118b is electrically insulated from the source electrode 1118a and the drain electrode 1118c.

The passivation layer 1116 is over the first plate 1120 having the thin film transistor 1119. The passivation layer 1116 includes a contact hole through which the drain electrode 1118c is partially exposed.

The organic layer 1114 is over the first plate 1120 having the thin film transistor 1119 and the passivation layer 1116. The thin film transistor 1119 is electrically insulated from the first pixel electrode part 1112 and the second pixel electrode part 1113. The organic layer 1114 includes a contact hole through which the drain electrode 1118c is partially exposed.

The organic layer 1114 further includes a protruded portion 1115, an embossed portion, and a protrusion 1134a for the multi-domain.

The protruded portion 1115 corresponds to the spacer 1110 so that an arrangement of the liquid crystal layer 1108 adjacent to the protruded portion 1115 is controlled. The embossed portion is in the reflection region 1128 to improve a reflectivity of the second pixel electrode part 1113.

The protrusion 1134a for the multi-domain is on the organic layer 1114 corresponding to the recess 1132a for the multi-domain. The protrusion 1134a for the multi-domain has a quadrangular shape that is extended in a direction that is substantially parallel with the source line 1118a'. In this embodiment, the protrusion 1134a for the multi-domain is formed from the same layer as the organic layer 1114.

The first pixel electrode part 1112 is formed on the organic layer 1114 corresponding to the pixel region 1140, an inner surface of the contact hole, and a protrusion 1134a for the multi-domain so that the first pixel electrode part 1112 is electrically connected to the drain electrode 1118c.

The second pixel electrode part 1113 is on the organic layer 1114 corresponding to the reflection region 1128 so that the light is reflected from the second pixel electrode part 1113.

The liquid crystal layer 1108 is between the upper substrate 1170 and the lower substrate 1180, and the liquid crystal layer 1108 is sealed by a sealant (not shown). In this embodiment, the liquid crystal layer 1108 has the VA mode.

When the voltage is applied to the first pixel electrode part 1112, the second pixel electrode part 1113, and the common electrode 1106, electric fields formed in regions adjacent to the protruded portion 1115, the spacer 1110, the stepped portion between the overcoating layer 1105 and the color filter 1104, the recess 1132a for the multi-domain, and the protrusion 1132a for the multi-domain are distorted. Therefore, the multi-domain is formed in the liquid crystal layer 1108 to increase the viewing angle of the LCD apparatus.

FIGS. 14A to 14J are cross-sectional views showing a method of manufacturing the LCD apparatus shown in FIG. 10.

Figure 14A:
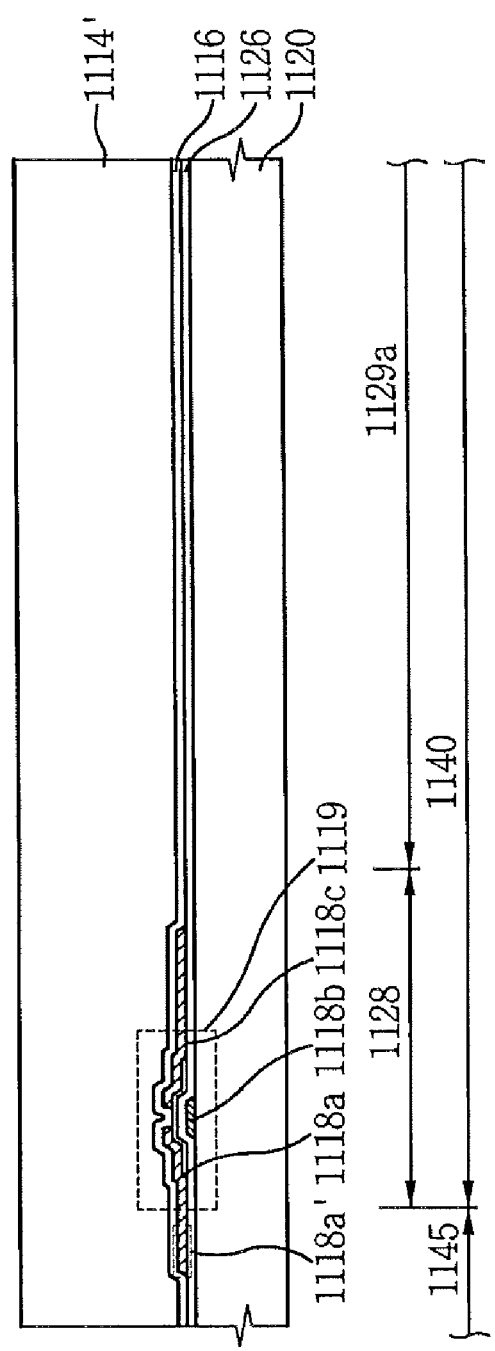
FIGS. 14A to 14J are cross-sectional views showing a method of manufacturing the LCD apparatus shown in FIG. 10.

Referring to FIG. 14A, the thin film transistor 1119 is formed on the first plate 1120. A transparent insulating material is deposited on the first plate 1120 having the thin film transistor 1119. An organic material 1114' is coated on the deposited transparent insulating material. In this embodiment, the organic material includes photoresist.

Figure 14B:
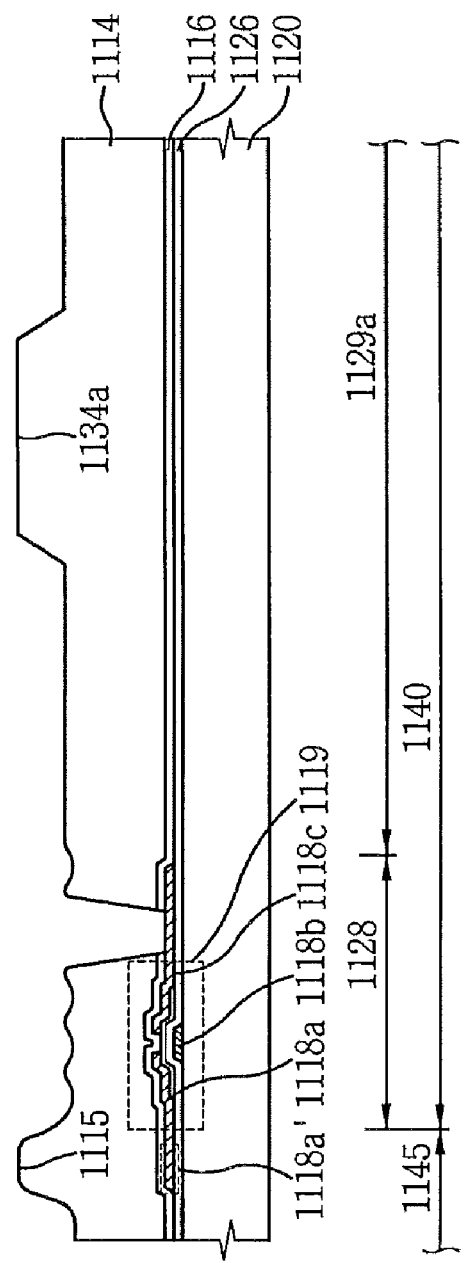

Referring to FIG. 14B, the coated organic material 1114' is exposed through a mask to form an organic layer 1114. The exposed organic material 1114' is developed to form the contact hole, the protruded portion 1115, the embossed portion, and the protrusion 1134a for the multi-domain. In this embodiment, the coated organic material 1114' is exposed using a single mask. Alternatively, the coated organic material may be exposed using a plurality of masks. The mask includes a transparent portion, opaque portions, and a translucent portion. The transparent portion corresponds to the contact hole. The opaque portions correspond to the protruded portion 1115 and the protrusion 1134*a* for the multi-domain. The translucent portion corresponds to the embossed portion. Therefore, a height difference of the organic layer 1114 is decreased so that a manufacturing process of the LCD apparatus is simplified. Alternatively, the translucent portions may include a plurality of slits.

Figure 14C:
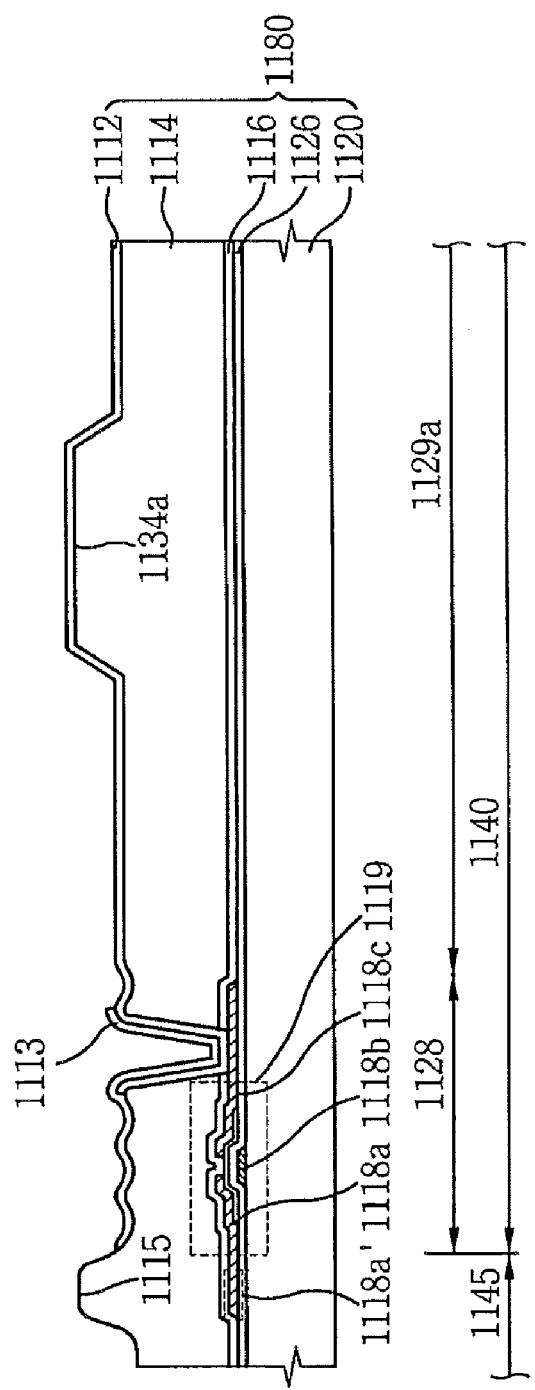

Referring to FIG. 14C, the first pixel electrode part 1112 is formed in the pixel region 1140 of the first plate 1120 having the organic layer 1114. The second pixel electrode part 1113 is formed in the reflection region of the first plate 1120 having the first pixel electrode part 1112.

Therefore, the lower substrate 1180 having the first plate 1120, the thin film transistor 1119, the source line 1118*a'*, the gate line 1118*b'* shown in FIG. 10, the organic layer 1114, the first pixel electrode part 1112, the second pixel electrode part 1113, and the protrusion 1134*a* for the multi-domain is completed.

Figure 14D:
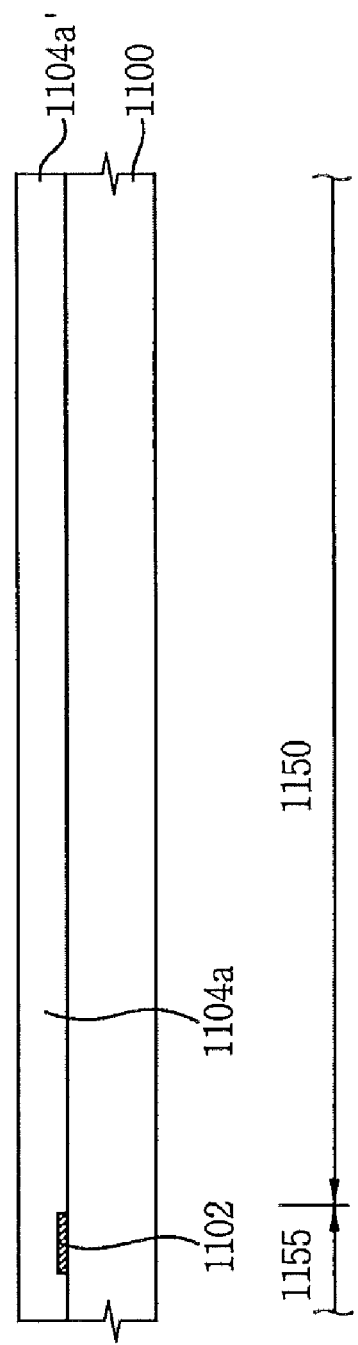

Referring to FIG. 14D, the black matrix 1102 is formed on the second plate 1100. A mixture 1104*a'* of a red colorant and photoresist is coated on the second plate 1100 having the black matrix 1102.

Figure 14E:
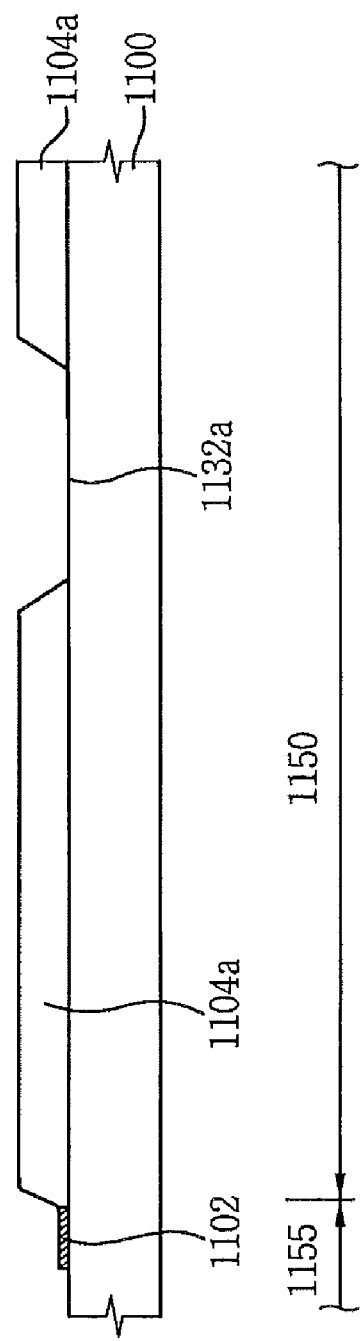

Referring to FIG. 14E, the coated mixture 1104*a'* is exposed through the mask and developed to form the red color filter portion 1104*a* and the recess 1132*a* for the multi-domain.

Figure 14F:
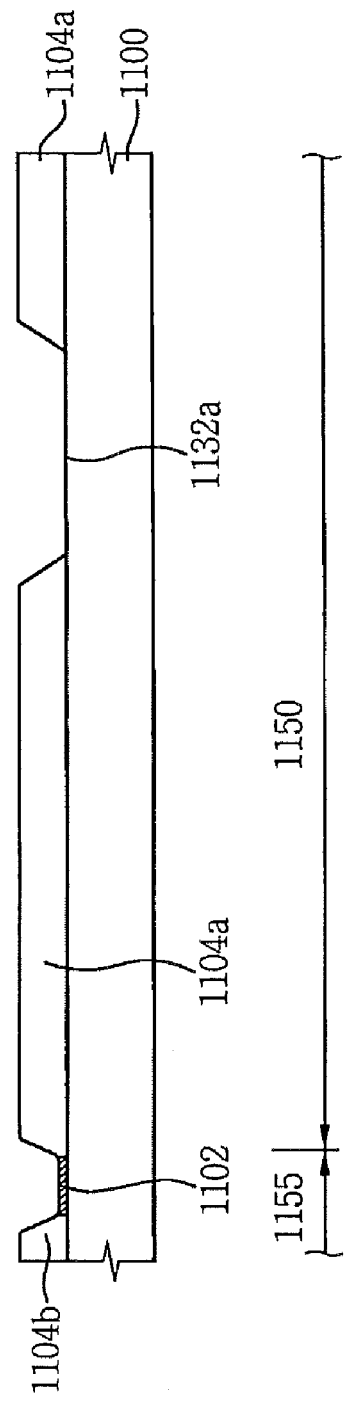

Referring to FIG. 14F, the green color filter portion 1104*b* and the blue color filter portion (not shown) are formed on the second plate 1100 having the black matrix 1102 and the red color filter portion 1104*a*.

Figure 14G:
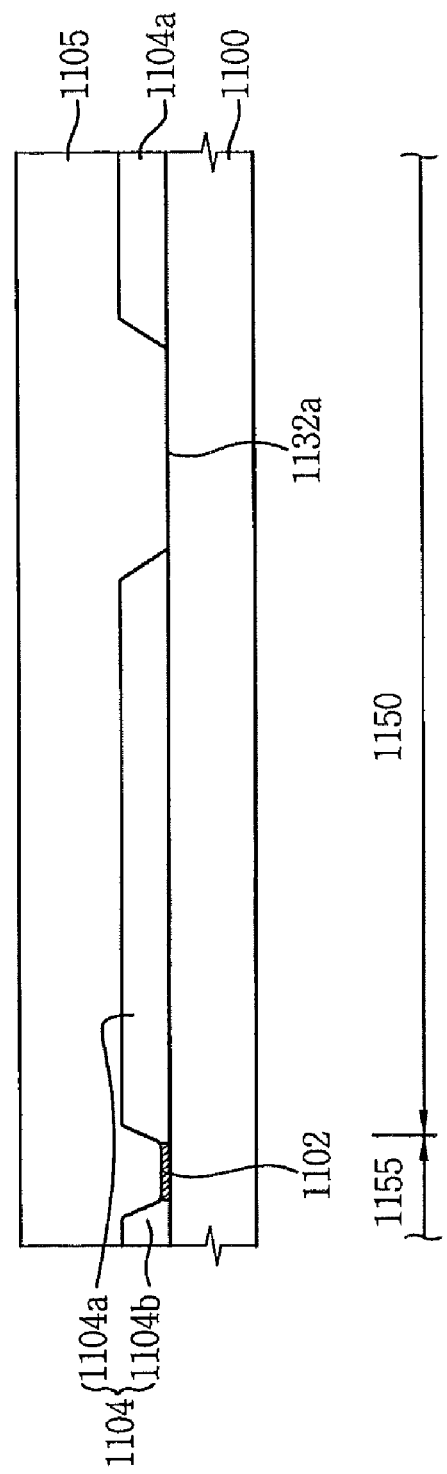

Referring to FIG. 14G, the organic material 1105' having the photoresist is coated over the second plate 1100 having the black matrix 1102 and the color filter 1104.

Figure 14H:
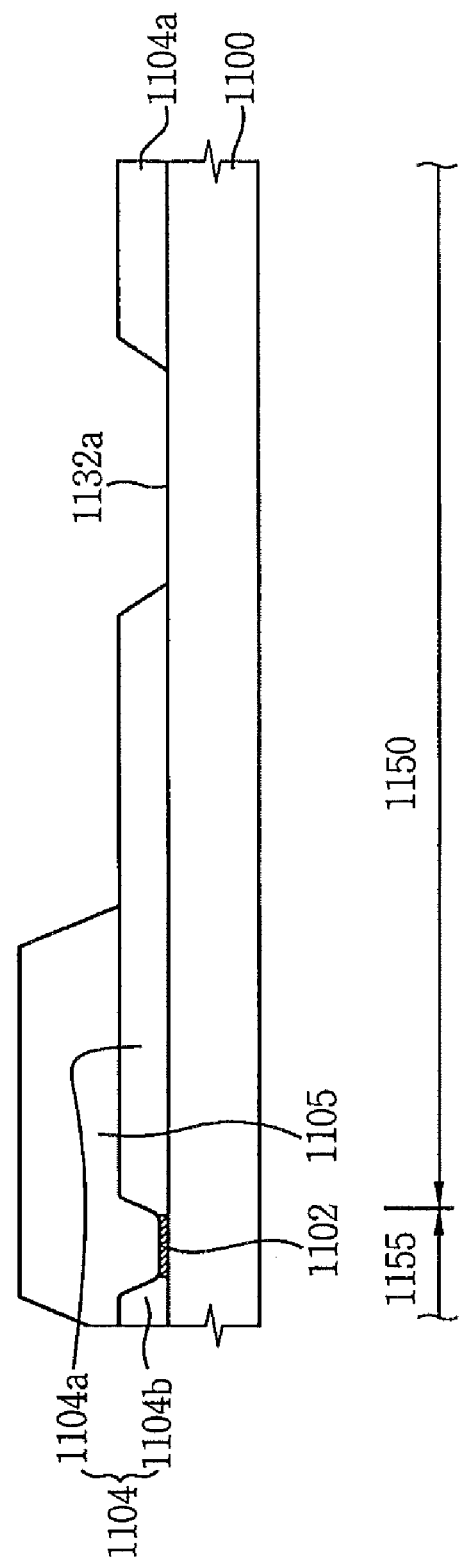

Referring to FIG. 14H, the coated organic material 1105' is exposed through the mask and developed to form overcoating layer 1105 so that the color filter 1104 corresponding to the transmission window 1129*a* of the lower substrate 1180 and the recess 1132*a* for the multi-domain are opened.

Figure 14I:
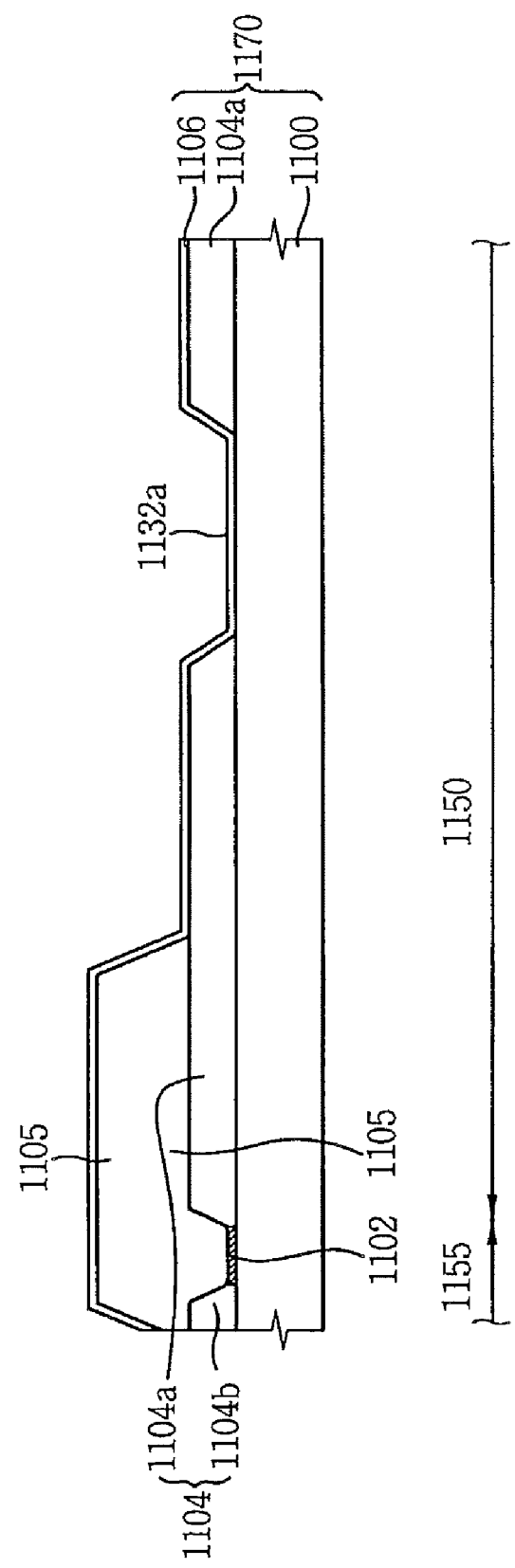

Referring to FIG. 14I, a transparent conductive material is deposited over the second plate 1100 having the black matrix 1102, the color filter 1104, and the overcoating layer 1105 to form the common electrode 1106.

Figure 14J:
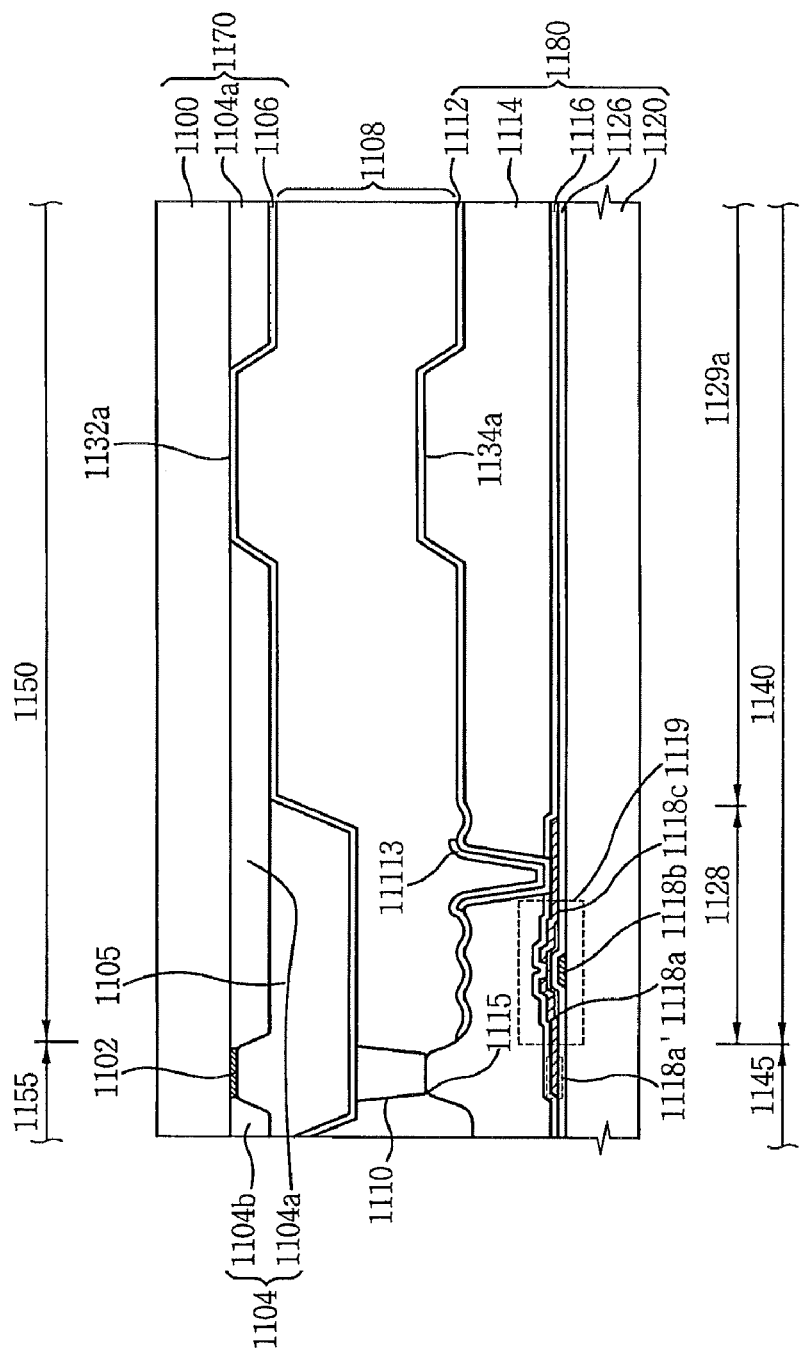

Referring to FIG. 14J, the spacer 1110 is formed on the common electrode 1106 corresponding to the black matrix 1102, and the upper substrate 1170 is combined with the lower substrate 1180. The liquid crystal layer 1108 is interposed between the upper substrate 1170 and the lower substrate 1180. The liquid crystal layer 1108 is sealed by the sealant (not shown).

According to this embodiment, when the voltage is applied to the common electrode 1106, the first pixel electrode 1112, and the second pixel electrode part 1113, the multi-domain is formed in the regions adjacent to the protruded portion 1115, the spacer 1110, the stepped portion between the overcoating layer 1105 and the color filter 1104, the recess 1132*a* for the multi-domain, and the protrusion 1134*a* for the multi-domain.

In addition, the liquid crystal layer 1108 of the transmission window 1129*a* has different thickness from the liquid crystal layer 1108 of the reflection region 1128 by the overcoating layer 1105 so that the height difference of the organic layer 1114 is decreased so that the protrusion 1134*a* for the multi-domain may be easily formed.

Figure 15:
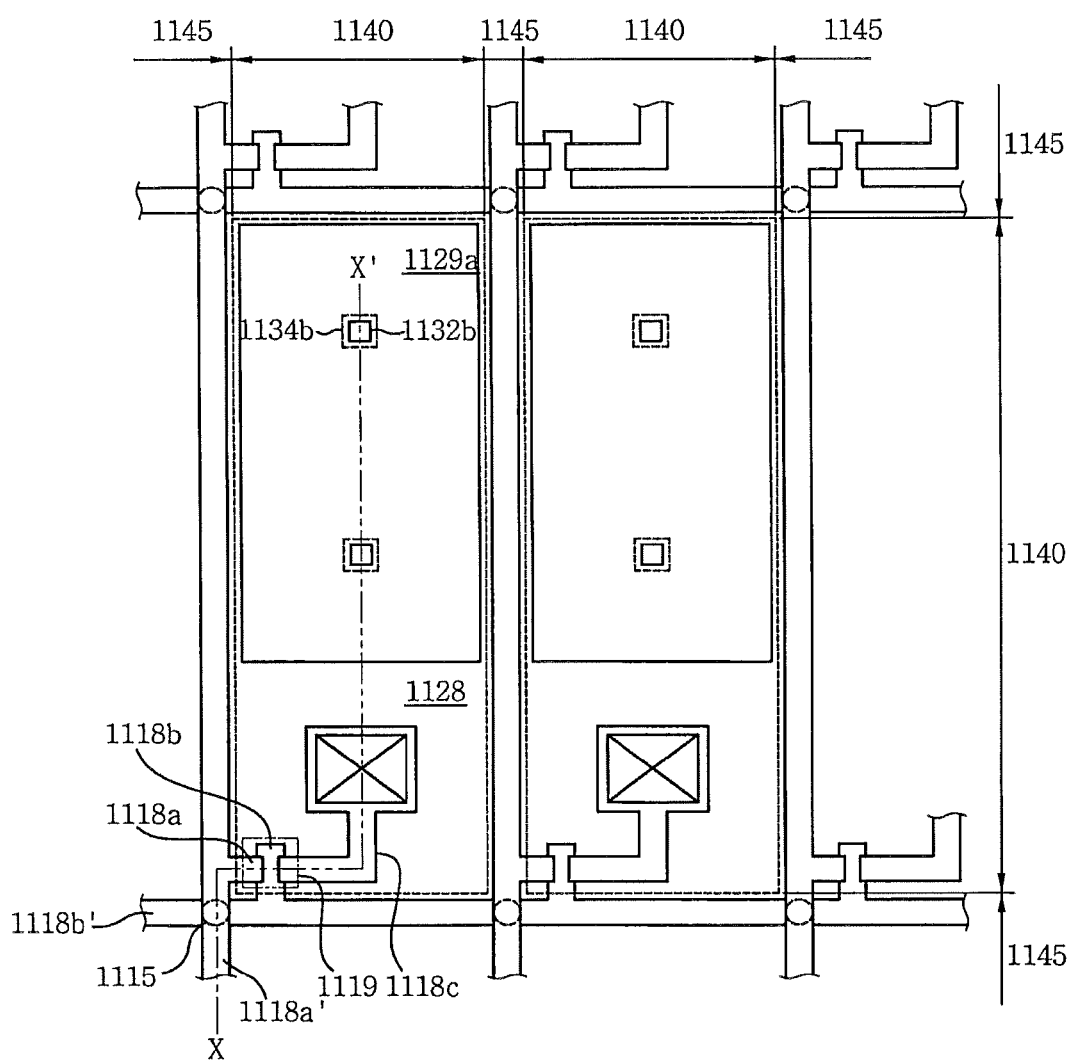
FIG. 15 is a plan view showing an LCD apparatus in accordance with another embodiment of the present invention.
Figure 16:
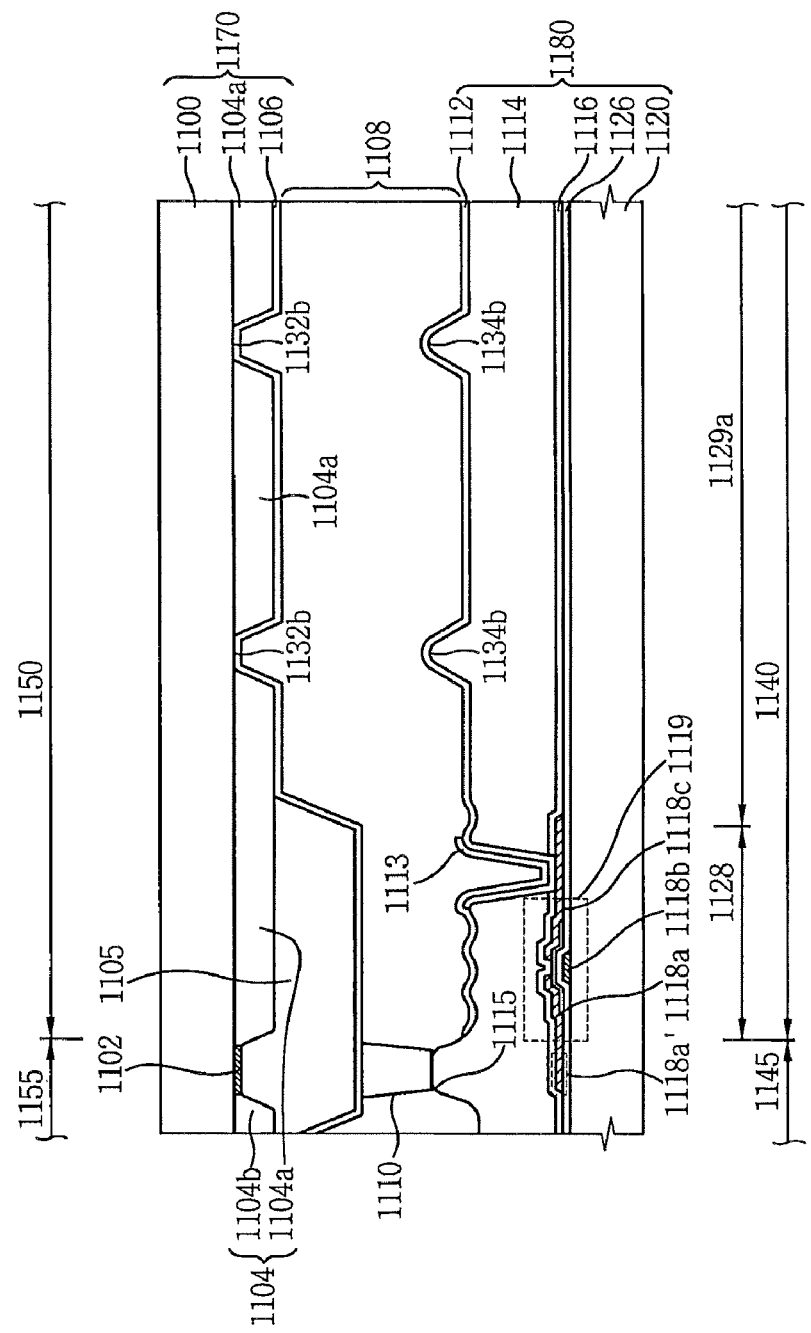
FIG. 16 is a cross-sectional view taken along the line X-X' shown in FIG. 15.

FIG. 15 is a plan view showing an LCD apparatus in accordance with another embodiment of the present invention. FIG. 16 is a cross-sectional view taken along the line X-X' shown in FIG. 15.

The LCD apparatus of FIGS. 15 and 16 is substantially the same as the apparatus shown in FIGS. 10 to 13 except for a recess for a multi-domain and a protrusion for the multi-domain. Thus, the same reference numerals will be used to refer to the same or like parts as those described in FIGS. 10 to 13 and further explanation will be omitted.

Referring to FIGS. 15 to 16, the LCD apparatus includes an upper substrate 1170, a lower substrate 1180, and a liquid crystal layer 1108 in between the substrates.

The upper substrate 1170 includes a second plate 1100, a black matrix 1102, a color filter 1104, an overcoating layer 1105, a common electrode 1106, a spacer 1110, and two recesses 1132*b* for a multi-domain. The upper substrate 1170 may include a plurality of the color filters, a plurality of the spacers, and a plurality of the recesses for the multi-domain. The upper substrate 1170 includes a display region 1150 and a peripheral region 1155 that surrounds the display region 1150. The upper substrate 1170 may include a plurality of the display regions.

The lower substrate 1180 includes a first plate 1120, a thin film transistor 1119, a source line 1118*a'*, a gate line 1118*b'*, a gate insulating layer 1126, a passivation layer 1116, a storage capacitor (not shown), an organic layer 1114, a first pixel electrode part 1112, a second pixel electrode part 1113, and two protrusions 1134*b* for the multi-domain. The lower substrate 1180 may include a plurality of the thin film transistors, a plurality of the source lines, a plurality of the gate lines, a plurality of the storage capacitors, a plurality of the first pixel electrode parts, a plurality of the second pixel electrode parts, and a plurality of the protrusions for the multi-domain.

The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129*a* through which a light generated from a backlight assembly (not shown) passes and a reflection region 1128 on which a light that is provided from an exterior is reflected to the upper substrate 1170.

The color filter 1104 is formed in the display region 1150 of the second plate 1100 having the black matrix 1102 so that the light having a predetermined wavelength may pass through the color filter 1104. The color filter 1104 includes a red color filter portion 1104*a*, a green color filter portion 1104*b*, and a blue color filter portion.

The color filter 1104 includes the recesses 1132*b* for the multi-domain so that the multi-domain is formed in the liquid crystal layer 1108. A portion of the color filter 1104 is removed to form the recesses 1132*b* for the multi-domain. The recesses 1132*b* for the multi-domain correspond to the transmission window 1129*a*. In this embodiment, the recesses 1132*b* for the multi-domain are on a central line of the transmission window 1129*a*, and in an example the recesses 1132*b* for the multi-domain have a rectangular shape that is extended in a direction substantially parallel with the central line. Alternatively, the recesses 1132*b* for the multi-domain may be extended in a direction substantially parallel with the source line 1118*a'*.

The overcoating layer 1105 is on the second plate 1100 having the black matrix 1102 and the color filter 1104.

The overcoating layer 1105 corresponding to the transmission window 1129a is opened so that the upper substrate 1170 of the transmission window 1129a has different height from the upper substrate 1170 of the reflection region 1128.

The organic layer is formed on the first plate 1120 having the thin film transistor 1119 and the passivation layer 1116 so that the thin film transistor 1119 is electrically insulated from the first and second pixel electrode parts 1112 and 1113. The organic layer 1114 includes a contact hole through which a drain electrode 1118c of the thin film transistor 1119 is partially exposed.

The organic layer 1114 further includes a protruded portion 1115, an embossed portion, and two protrusions 1134b for the multi-domain.

Each of the protrusions 1134b for the multi-domain is on the organic layer 1114 corresponding to each of the recesses 1132b for the multi-domain. In this embodiment, each of the protrusions 1134b for the multi-domain has a rectangular shape. Alternatively, each of the protrusions for the multi-domain may have a variety of shapes, including a quadrangular shape in one example. In this embodiment, the protrusions 1134b for the multi-domain are formed from the same layer as the organic layer 1114.

When voltage is applied to the first pixel electrode part 1112, the second pixel electrode part 1113, and the common electrode 1106, a plurality of domains is formed in regions adjacent to the recesses 1132b for the multi-domain and the protrusions 1132b for the multi-domain. Therefore, the number of domains in the multi-domain is increased so that the viewing angle of the LCD apparatus is increased.

Figure 17:
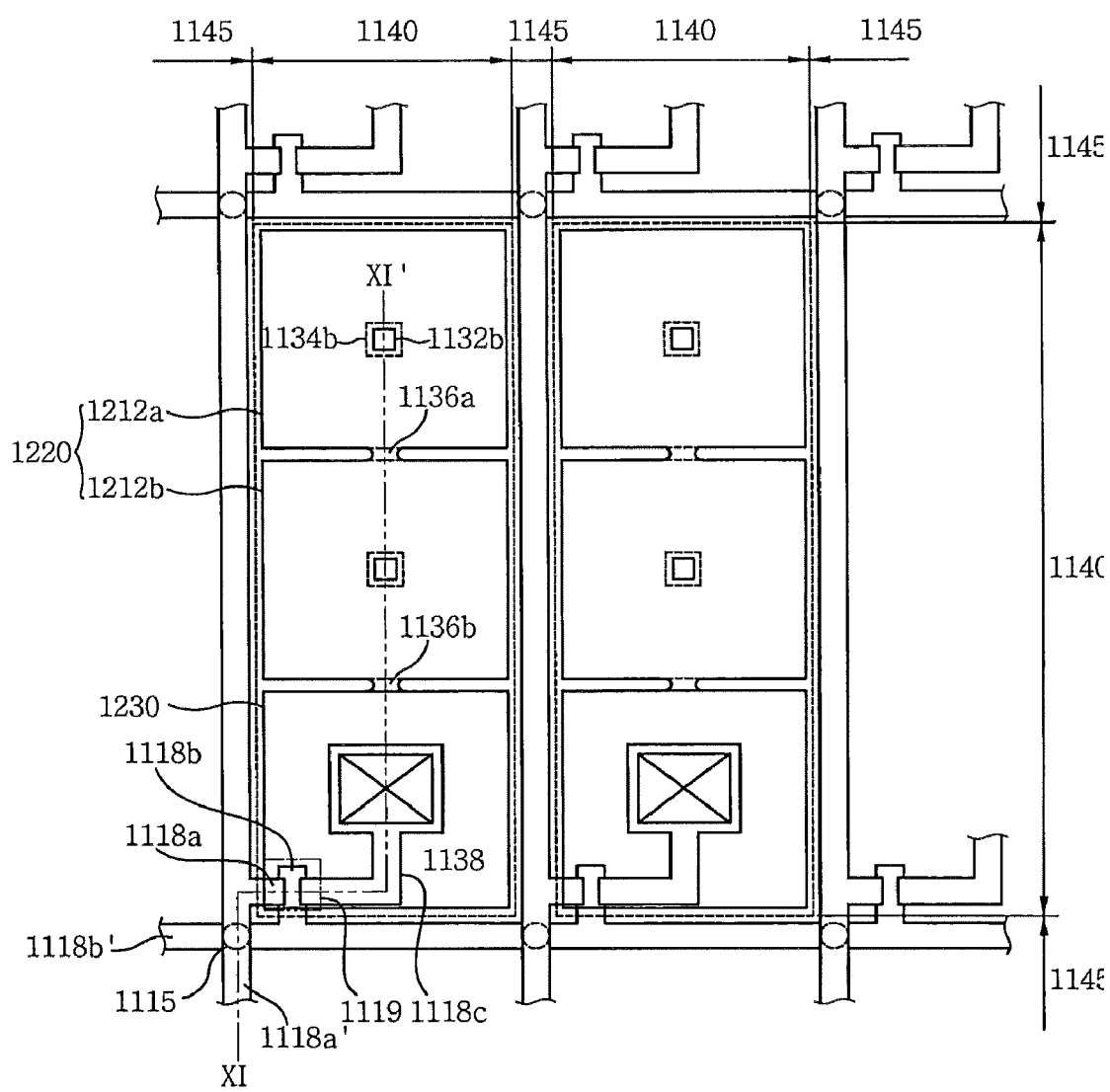
FIG. 17 is a plan view showing an LCD apparatus in accordance with another embodiment of the present invention.
Figure 18:
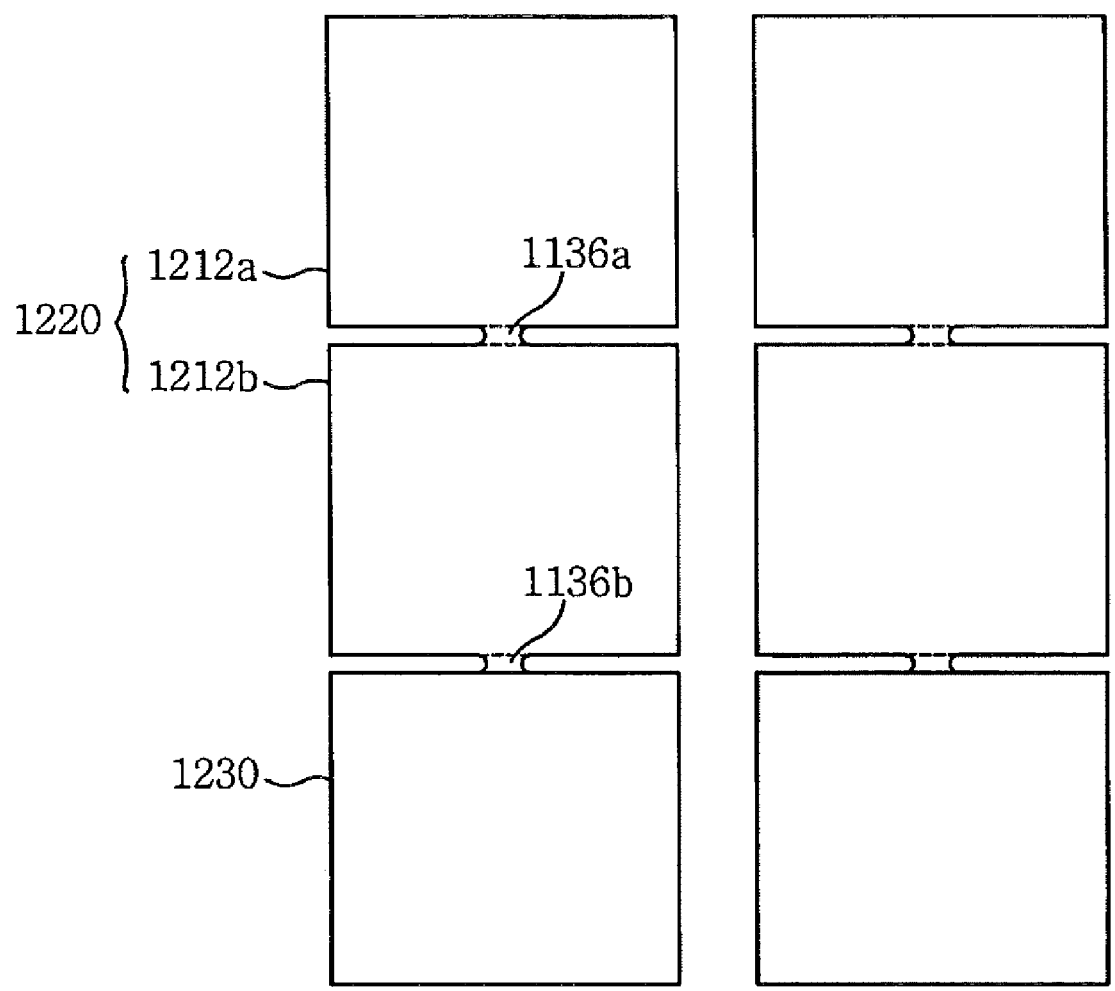
FIG. 18 is a plan view showing a first pixel electrode part and a second pixel electrode part shown in FIG. 17.
Figure 19:
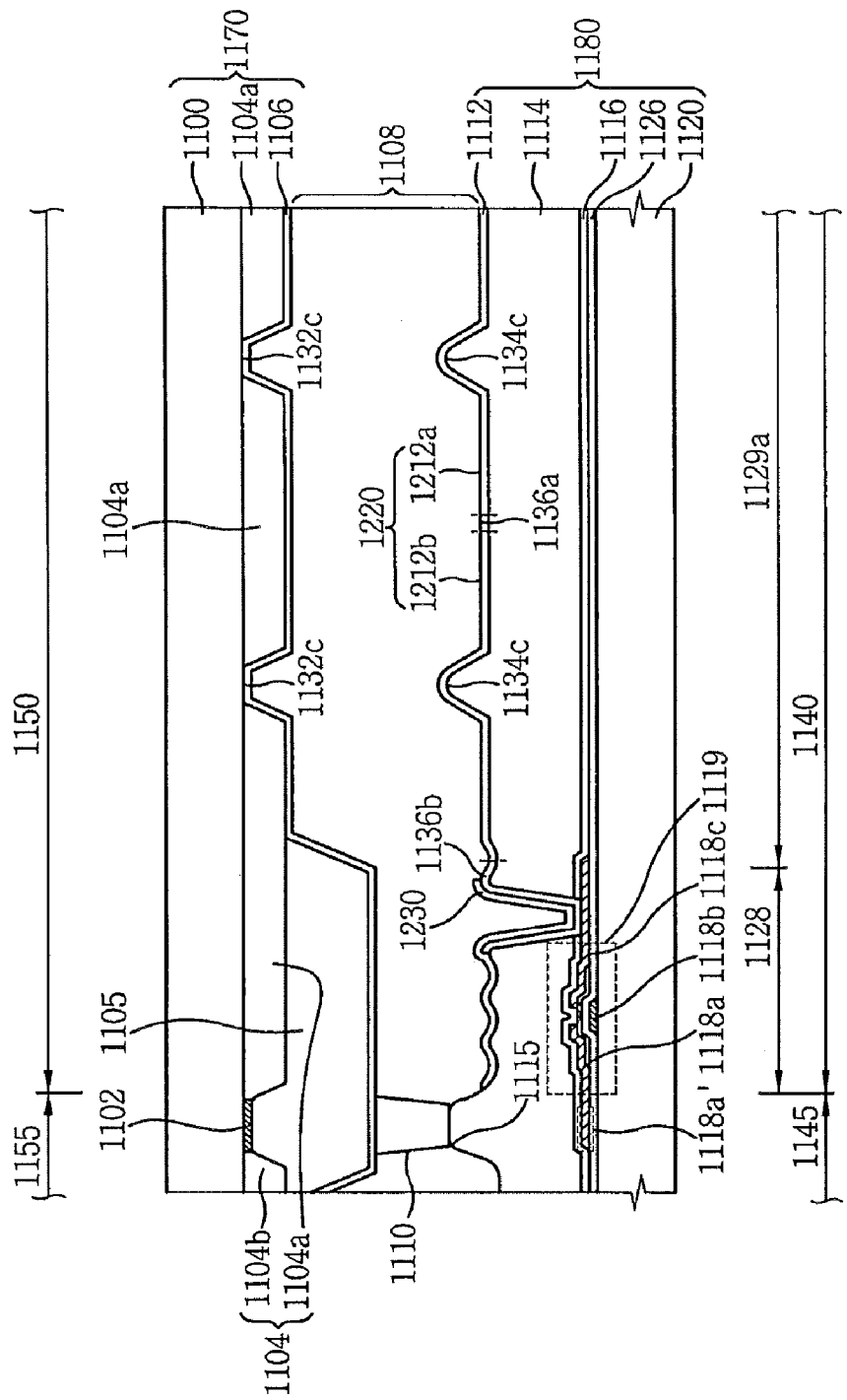
FIG. 19 is a cross-sectional view taken along the line XI-XI' shown in FIG. 17.

FIG. 17 is a plan view showing an LCD apparatus in accordance with another embodiment of the present invention. FIG. 18 is a plan view showing a first pixel electrode part and a second pixel electrode part shown in FIG. 17. FIG. 19 is a cross-sectional view taken along the line XI-XI' shown in FIG. 17.

The LCD apparatus of FIGS. 17 to 19 is substantially the same as the apparatus shown in FIGS. 15 and 16 except for the first and second pixel electrode parts. Thus, the same reference numerals will be used to refer to the same or like parts as those described in FIGS. 15 and 16 and further explanation will be omitted.

Referring to FIGS. 17 to 19, the LCD apparatus includes an upper substrate 1170, a lower substrate 1180, and a liquid crystal layer 1108 in between the substrates.

The upper substrate 1170 includes a second plate 1100, a black matrix 1102, a color filter 1104, an overcoating layer 1105, a common electrode 1106, a spacer 1110, and two recesses 1132c for a multi-domain. The upper substrate 1170 may include a plurality of the color filters, a plurality of the spacers, and a plurality of the recesses for the multi-domain. The upper substrate 1170 includes a display region 1150 and a peripheral region 1155 that surrounds the display region 1150. The upper substrate 1170 may include a plurality of the display regions.

The lower substrate 1180 includes a first plate 1120, a thin film transistor 1119, a source line 1118a', a gate line 1118b', a gate insulating layer 1126, a passivation layer 1116, a storage capacitor (not shown), an organic layer 1114, a first pixel electrode part 1220, a second pixel electrode part 1230, and two protrusions 1134c for the multi-domain. The lower substrate 1180 may include a plurality of the thin film transistors, a plurality of the source lines, a plurality of the gate lines, a plurality of the storage capacitors, a plurality of the first pixel electrode parts, a plurality of the second pixel electrode parts, and a plurality of the protrusions for the multi-domain. The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129a through which a light generated from a backlight assembly (not shown) passes and a reflection region 1128 on which a light that is provided from an exterior is reflected to the upper substrate 1170.

The color filter 1104 includes the recesses 1132c for the multi-domain so that the multi-domain is formed in the liquid crystal layer 1108. Portions of the color filter 1104 are removed to form the recesses 1132c for the multi-domain. The recesses 1132c for the multi-domain correspond to the transmission window 1129a. In this embodiment, the recesses 1132c for the multi-domain are on a central line of the transmission window 1129a, and each of the recesses 1132c for the multi-domain has a rectangular shape in one example.

The organic layer 1114 is on the first plate 1120 having the thin film transistor 1119 and the passivation layer 1116. The organic layer 1114 includes a protruded portion 1115, an embossed portion, the protrusions 1134c for the multi-domain, and a contact hole through which the drain electrode 1118c is partially exposed. Each of the protrusions 1134c for the multi-domain is on the organic layer 1114 corresponding to each of the recesses 1132c for the multi-domain.

The first pixel electrode part 1112 includes a first transparent electrode portion 1212a, a second transparent electrode portion 1212b, a first connecting portion 1136a, and a second connecting portion 1136b.

The first and second transparent electrode portions 1212a and 1212b are on the organic layer 1114 corresponding to the transmission window 1129a. The second transparent electrode portion 1212b is adjacent to the first transparent electrode portion 1212a.

The first connecting portion 1136a is between the first and second transparent portions 1212a and 1212b to connect the first transparent electrode portion 1212a to the second transparent electrode portion 1212b. In this embodiment, each of the first and second transparent electrode portions 1212a and 1212b has a rectangular shape.

The second connecting portion 1136b is adjacent to the second transparent electrode portion 1212b opposite the first connecting portion 1136a to connect the second transparent electrode portion 1136b to the second pixel electrode part 1230. Alternatively, a portion of the second transparent electrode portion 1136b is extended into the contact hole to electrically connect the second transparent electrode portion 1136b to the drain electrode 1118c of the thin film transistor 1119.

The second pixel electrode part 1230 is on the organic layer 1114 corresponding to the reflection region 1128. The second pixel electrode part 1230 has a rectangular shape in one example.

Alternatively, each of the first transparent electrode part 1212a, the second transparent electrode part 1212b, and the second pixel electrode part 1230 may have a variety of shapes including but not limited to a polygonal shape, and a circular shape. The polygonal shape may include a quadrangular shape, a hexagonal shape, and an octagonal shape, to name a few.

An interval between the first and second transparent electrode portions 1212a and 1212b and an interval between the second transparent electrode portion 1212*b* and the second pixel electrode part 1230 are adjusted to control an alignment of a liquid crystal of the liquid crystal layer 1108.

The liquid crystal layer 1108 is between the upper substrate 1170 and the lower substrate 1180. In this embodiment, the liquid crystal layer 1108 has a VA mode.

When voltage is applied to the first pixel electrode part 1220 and the common electrode 1106, a plurality of domains is formed in regions adjacent to the recesses 1132*c* for the multi-domain and the protrusions 1134*c* for the multi-domain.

In addition, electric fields formed between the first and second transparent electrode portions 1212*a* and 1212*b* and between the second transparent electrode portion 1212*b* and the second pixel electrode part 1230 are distorted. Therefore, an alignment of the liquid crystal of the liquid crystal layer 1108 is controlled so that a viewing angle of the LCD apparatus is increased.

Figure 20:
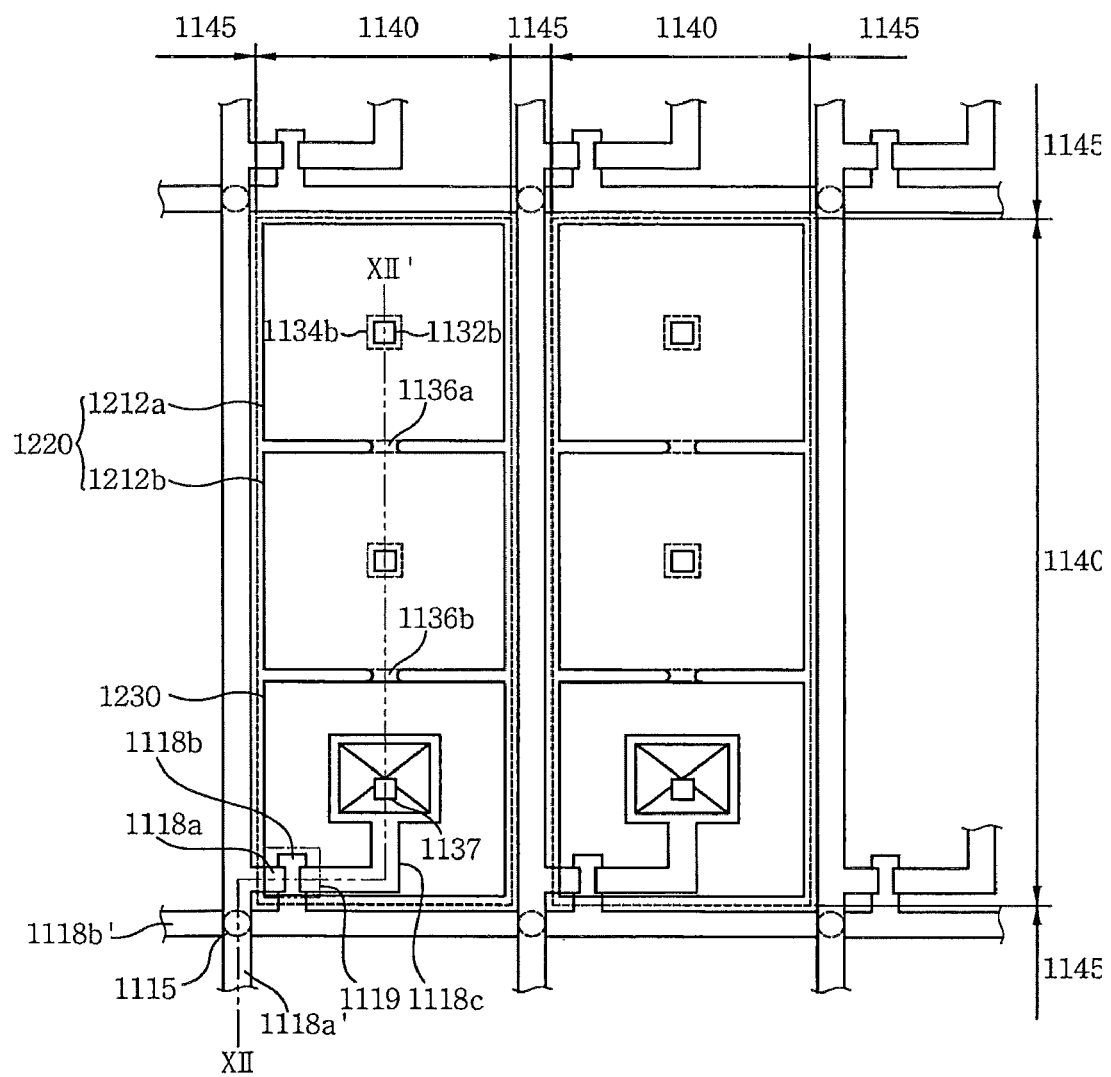
FIG. 20 is a plan view showing an LCD apparatus in accordance with another embodiment of the present invention.
Figure 21:
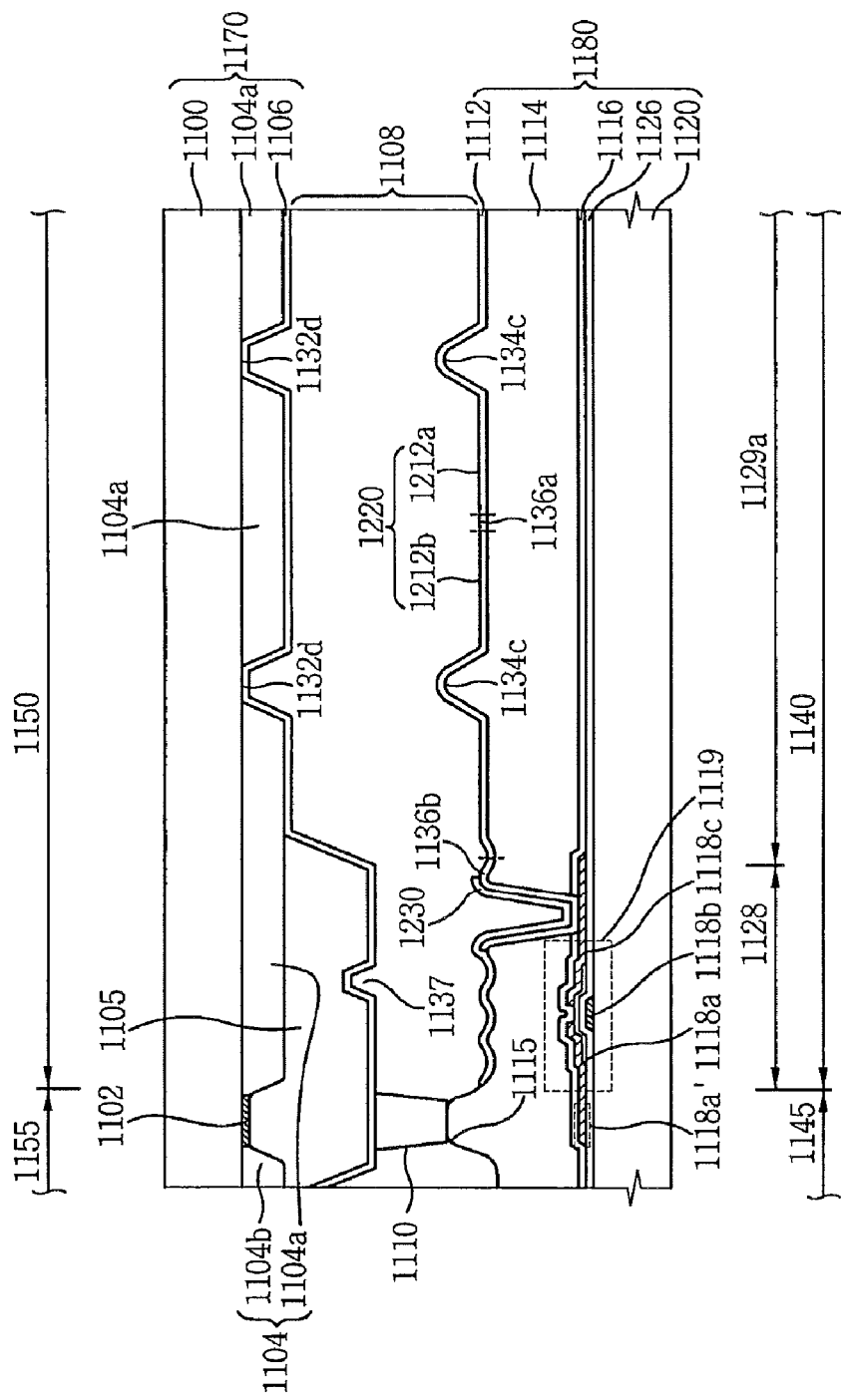
FIG. 21 is a cross-sectional view taken along the line XII-XII' shown in FIG. 20.

FIG. 20 is a plan view showing an LCD apparatus in accordance with another embodiment of the present invention. FIG. 21 is a cross-sectional view taken along the line XII-XII' shown in FIG. 20.

The LCD apparatus of FIGS. 20 and 21 is substantially the same as the structure shown in FIGS. 17 to 19 except for a second recess for a multi-domain. Thus, the same reference numerals will be used to refer to the same or like parts as those described in FIGS. 17 to 19 and further explanation will be omitted.

Referring to FIGS. 20 and 21, the LCD apparatus includes an upper substrate 1170, a lower substrate 1180, and a liquid crystal layer 1108 in between the substrates.

The upper substrate 1170 includes a second plate 1100, a black matrix 1102, a color filter 1104, an overcoating layer 1105, a common electrode 1106, a spacer 1110, two first recesses 1132*d* for a multi-domain and a second recess 1137 for the multi-domain. The upper substrate 1170 may include a plurality of the color filters, a plurality of the spacers, a plurality of the first recesses for the multi-domain, and a plurality of the second recesses for the multi-domain. The upper substrate 1170 includes a display region 1150 and a peripheral region 1155 that surrounds the display region 1150. The upper substrate 1170 may include a plurality of the display regions.

The lower substrate 1180 includes a first plate 1120, a thin film transistor 1119, a source line 1118*a*', a gate line 1118*b*', a gate insulating layer 1126, a passivation layer 1116, a storage capacitor (not shown), an organic layer 1114, a first pixel electrode part 1220, a second pixel electrode part 1230, and two protrusions 1134*d* for the multi-domain. The lower substrate 1180 may include a plurality of the thin film transistors, a plurality of the source lines, a plurality of the gate lines, a plurality of the storage capacitors, a plurality of the first pixel electrode parts, a plurality of the second pixel electrode parts, and a plurality of the protrusions for the multi-domain. The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129*a* through which a light generated from a backlight assembly (not shown) passes and a reflection region 1128 on which a light that is provided from an exterior is reflected to the upper substrate 1170.

The overcoating layer 1105 corresponding to the transmission window 1129*a* is opened so that the upper substrate 1170 of the transmission window 1129*a* has different thickness from the upper substrate 1170 of the reflection region 1128.

The second recess 1137 for the multi-domain is on the overcoating 1105 corresponding to the reflection region 1128 of the lower substrate 1180.

The protrusions 1134*d* for the multi-domain are on the organic layer 1114 corresponding to the first recesses 1132*d* for the multi-domain.

When voltage is applied to the second pixel electrode part 1230 and the common electrode 1106, an electric field formed adjacent to the second recess 1137 for the multi-domain is distorted. Therefore, an alignment of liquid crystals of the liquid crystal layer 1108 adjacent to the second pixel electrode part 1230 is controlled to form a plurality of domains in the reflection region 1128.

Figure 22:
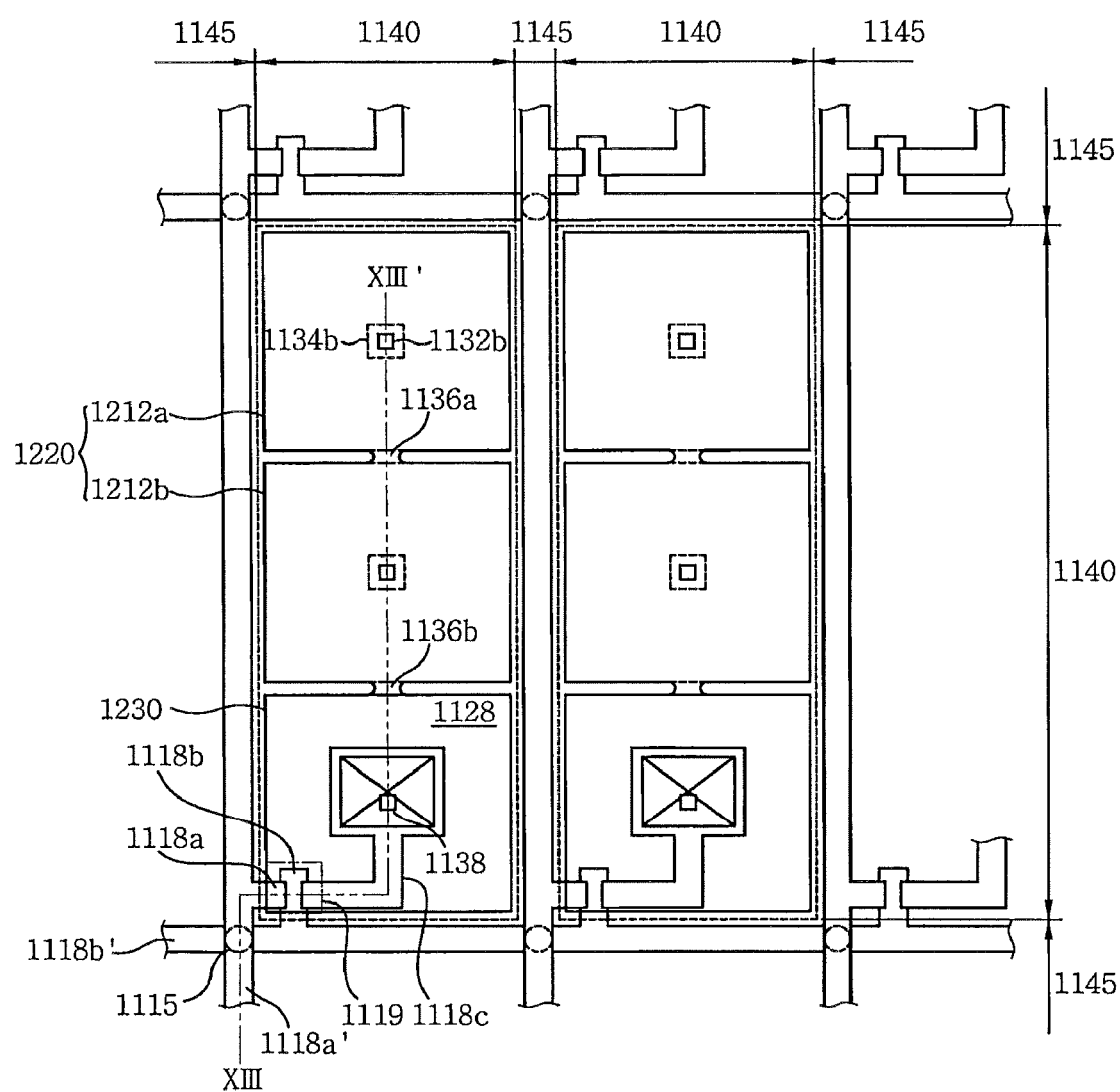
FIG. 22 is a plan view showing an LCD apparatus in accordance with another embodiment of the present invention.
Figure 23:
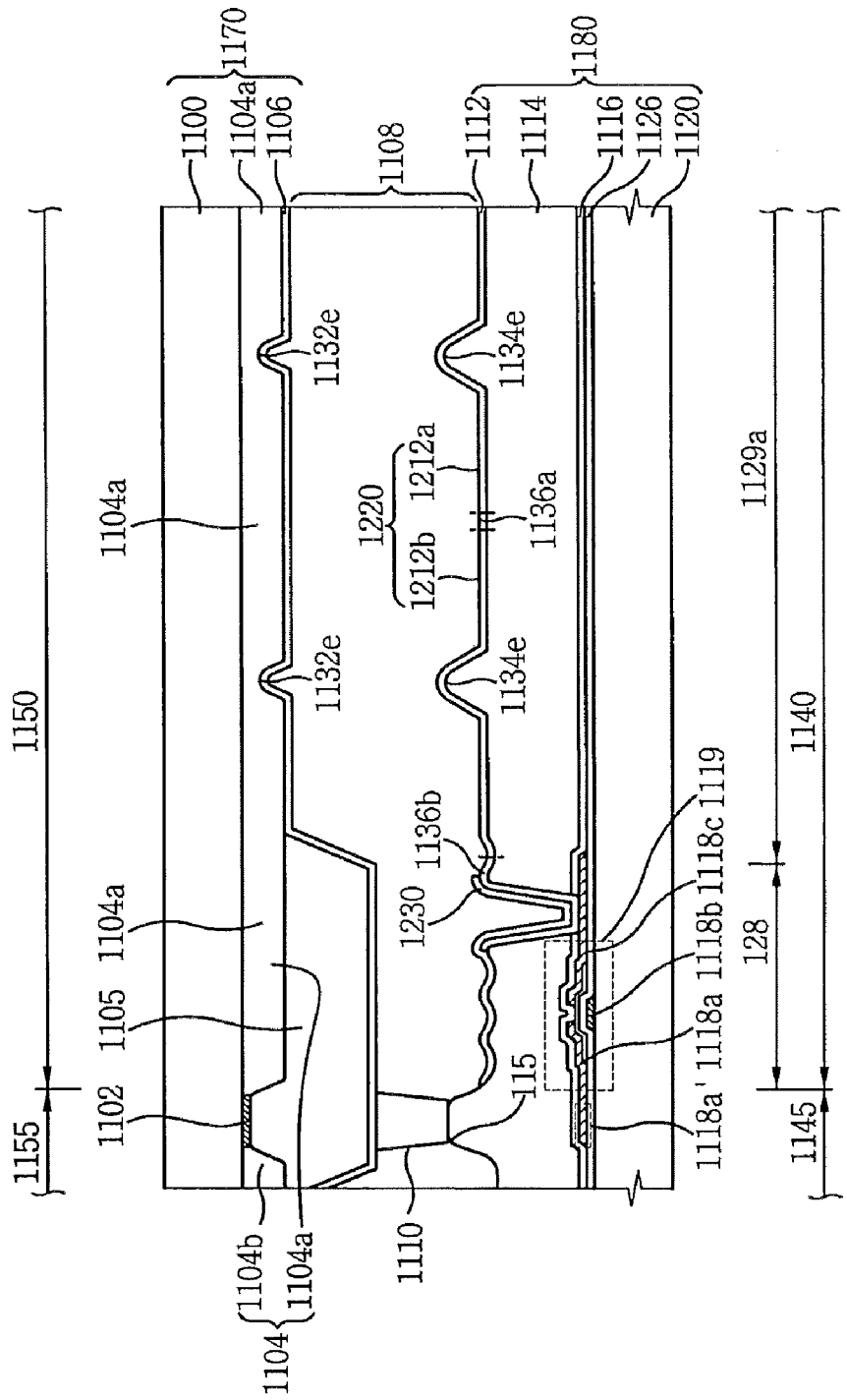
FIG. 23 is a cross-sectional view taken along the line XIII-XIII' shown in FIG. 22.

FIG. 22 is a plan view showing an LCD apparatus in accordance with another embodiment of the present invention. FIG. 23 is a cross-sectional view taken along the line XIII-XIII' shown in FIG. 22.

The LCD apparatus of FIGS. 22 and 23 is substantially the same as the apparatus shown in FIGS. 20 to 21 except for the first and second recesses for a multi-domain. Thus, the same reference numerals will be used to refer to the same or like parts as those described in FIGS. 20 to 21 and further explanation will be omitted.

Referring to FIGS. 22 and 23, the LCD apparatus includes an upper substrate 1170, a lower substrate 1180, and a liquid crystal layer 1108.

The upper substrate 1170 includes a second plate 1100, a black matrix 1102, a color filter 1104, an overcoating layer 1105, a common electrode 1106, a spacer 1110, two first recesses 1132*e* for a multi-domain, and a second recess 1138 for the multi-domain. The upper substrate 1170 may include a plurality of the color filters, a plurality of the spacers, a plurality of the first recesses for the multi-domain and a plurality of the second recesses for the multi-domain. The upper substrate 1170 includes a display region 1150 and a peripheral region 1155 that surrounds the display region 1150. The upper substrate 1170 may include a plurality of the display regions.

The lower substrate 1180 includes a first plate 1120, a thin film transistor 1119, a source line 1118*a*', a gate line 1118*b*', a gate insulating layer 1126, a passivation layer 1116, a storage capacitor (not shown), an organic layer 1114, a first pixel electrode part 1220, a second pixel electrode part 1230, and two protrusions 1134*e* for the multi-domain. The lower substrate 1180 may include a plurality of the thin film transistors, a plurality of the source lines, a plurality of the gate lines, a plurality of the storage capacitors, a plurality of the first pixel electrode parts, a plurality of the second pixel electrode parts, and a plurality of the protrusions for the multi-domain. The liquid crystal layer 1108 is between the upper substrate 1170 and the lower substrate 1180.

The lower substrate 1180 includes a pixel region 1140 and a blocking region 1145 in which a light is blocked. The pixel region 1140 corresponds to the display region 1150, and the blocking region 1145 corresponds to the peripheral region 1155. The pixel region 1140 includes a transmission window 1129*a* through which a light generated from a backlight assembly (not shown) passes and a reflection region 1128 on which a light that is provided from an exterior is reflected to the upper substrate 1170.

The color filter 1104 includes the recesses 1132*e* for the multi-domain so that the multi-domain is formed in the liquid crystal layer 1108. Portions of the color filter 1104 are removed to form the recesses 1132*e* for the multi-domain. A depth of each of the recesses 1132*e* for the multi-domain may be less than a thickness of the color filter 1104.

The second recess 1138 for the multi-domain is on the overcoating 1105 corresponding to the reflection region 1128 of the lower substrate 1180. In this embodiment, the second recess 1138 for the multi-domain has substantially equal size to each of the first recesses 1132e.

The protrusions 1134e for the multi-domain are on the organic layer 1114 corresponding to the first recesses 1132e for the multi-domain.

According to this embodiment, sizes of the first and second recesses 1132e and 1138 for the multi-domain are adjusted to control an alignment of liquid crystals of the liquid crystal layer 1108. According to the present invention, the display apparatus includes a liquid crystal layer having a vertical alignment (VA) mode and the multi-domain so that the image display quality of the display apparatus is improved. The liquid crystal layer having the VA mode may be inclined by a predetermined pretilt angle. In addition, the display apparatus may be manufactured without a rubbing process.

In particular, the liquid crystal layer includes the recess and protrusion for the multi-domain so that the multi-domain is formed in the liquid crystal layer, thereby improving the viewing angle of the LCD apparatus. In addition, the electric fields formed between the first and second transparent electrode portions and between the second transparent electrode portion and the second pixel electrode part are distorted so that the alignment of the liquid crystals of the liquid crystal layer is controlled, thereby improving the viewing angle of the LCD apparatus. Further, the manufacturing process of the display apparatus is simplified so that the manufacturing cost of the display apparatus is decreased.

This invention has been described above with reference to the embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display panel comprising:
    a lower substrate comprising:
        a plate comprising a transmission region through which a light may pass and a reflection region from which a light may be reflected;
        a switching element formed on the plate;
        an insulating layer formed on the plate to cover the switching element and the insulating layer formed in the reflection region;
        a transmission electrode electrically connected to the switching element, the transmission electrode being formed in the transmission region; and
        a protrusion formed on the transmission electrode, the protrusion divides the transmission electrode of the transmission region into a plurality of transmission portions;
    an upper substrate facing the lower substrate; and
    a liquid crystal layer disposed between the lower substrate and the upper substrate,
    wherein the protrusion is extended to reach a boundary of the transmission region so that the transmission portions are completely isolated from each other, and the protrusion is formed from the same layer as the insulation layer, and a height of the protrusion is no more than a thickness of the insulating layer of the reflection region.

2. The display panel of claim 1, wherein the upper substrate comprises a color filter layer having an opening disposed at a center of each of the transmission portions.

3. The display panel of claim 1, wherein the lower substrate comprises a reflection electrode electrically connected to the switching element, the reflection electrode being formed in the reflection region.

4. The display panel of claim 3, wherein the reflection electrode is formed on the transmission electrode.

5. The display panel of claim 3, wherein the transmission electrode is electrically connected to the switching element through the reflection electrode.

6. The display panel of claim 1, wherein the insulating layer is removed in the transmission region, and the protrusion comprises the same material as the insulating layer.

7. The display panel of claim 1, wherein the number of the protrusion is plural, and the plurality of protrusions is arranged along a longitudinal direction of the transmission region.

8. The display panel of claim 1, wherein the transmission electrode comprises a plurality of transmission electrode portions connected in series.

9. The display panel of claim 8, wherein each of the transmission electrode portions has a rectangular shape.

10. A method of manufacturing a display panel comprising:
    forming a switching element on a plate comprising a transmission region through which a light may pass and a reflection region from which a light may be reflected;
    forming an insulating layer on the plate having the switching element formed thereon;
    forming a transmission electrode in the transmission region to be electrically connected to the switching element, and
    patterning the insulating layer to form a protrusion on the transmission electrode, the protrusion divides the transmission electrode of the transmission region into a plurality of transmission portions,
    wherein the protrusion is extended to reach a boundary of the transmission region so that the transmission portions are completely isolated from each other, and the protrusion is formed from the same layer as the insulation layer, and a height of the protrusion is no more than a thickness of the insulating layer of the reflection region.

11. The method of claim 10, further comprising:
    forming a color filter on an upper plate;
    patterning the color filter to form an opening;
    disposing the upper plate having the color filter with the opening over the plate having the transmission electrode such that the opening of the color filter is disposed at a center of each of the transmission portions;
    combining the upper plate such that a liquid crystal layer is disposed between the plate and the upper plate.

12. The method of claim 10, further comprising forming a reflection electrode in the reflection region to be electrically connected to the switching element.

13. The method of claim 12, wherein the reflection electrode is formed on the transmission electrode.

14. The method of claim 12, wherein the transmission electrode is electrically connected to the switching element through the reflection electrode.

15. The method of claim 10, wherein said patterning the insulating layer to form the protrusion is patterning the insulating layer to remove the insulating layer of the transmission region except for a region corresponding to the protrusion.

16. The method of claim 10, wherein said patterning the insulating layer to form the protrusion is patterning the insulating layer except for a region corresponding to the protrusion.

17. The method of claim 16, wherein the number of the protrusion is plural, and the plurality of protrusions is arranged along a longitudinal direction of the transmission region.

* * * * *